(12) United States Patent
Mihara

(10) Patent No.: US 7,403,329 B2
(45) Date of Patent: Jul. 22, 2008

(54) ELECTRONIC IMAGING APPARATUS

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 535 days.

(21) Appl. No.: 10/776,590

(22) Filed: Feb. 12, 2004

(65) Prior Publication Data
US 2004/0179245 A1    Sep. 16, 2004

(30) Foreign Application Priority Data
Feb. 14, 2003    (JP) ............................. 2003-036650

(51) Int. Cl.
*G02B 5/20*    (2006.01)
(52) U.S. Cl. .................. 359/359; 359/350; 359/360
(58) Field of Classification Search ................ 359/359, 359/350, 360
See application file for complete search history.

(56) References Cited

U.S. PATENT DOCUMENTS 4,749,262 A *    6/1988    Langer et al. ............... 359/318
5,231,534 A *    7/1993    Kato .......................... 359/432

FOREIGN PATENT DOCUMENTS

| JP | 590113421 | * | 6/1984 |
| JP | 05-27093 |   | 4/1993 |
| JP | 11-160739 |   | 6/1999 |

* cited by examiner

*Primary Examiner*—Joshua L Pritchett
(74) *Attorney, Agent, or Firm*—Kenyon & Kenyon LLP

(57) ABSTRACT

The electronic imaging apparatus comprises a first optical element A having a flat surface and a surface with refracting power, chemical substance which enables to change light transmittance by chemical change according to electric quantity, a second optical element having a transparent surface and a flat surface, and an optical system having an optical component arranged so as to sandwich the chemical substance by a surface of the first optical element and a surface of the second optical element. Here the spectrum transmittance at whole range of $\tau min \leq \tau 520 \leq \tau max$ satisfies the following conditions when the whole transmittance of the first optical element, the chemical substance and the second optical element at the wavelength of 520 nm is $\tau 520$, $0.70 < \tau 440 / \tau 520 < 1.20$ $0.80 < \tau 600 / \tau 520 < 1.30$ where $\tau x$ (x is a number) is the transmittance at the wavelength of x nm.

4 Claims, 15 Drawing Sheets

CHEMICAL SUBSTANCE B

CHEMICAL SUBSTANCE B

CHEMICAL SUBSTANCE B

CHEMICAL SUBSTANCE B

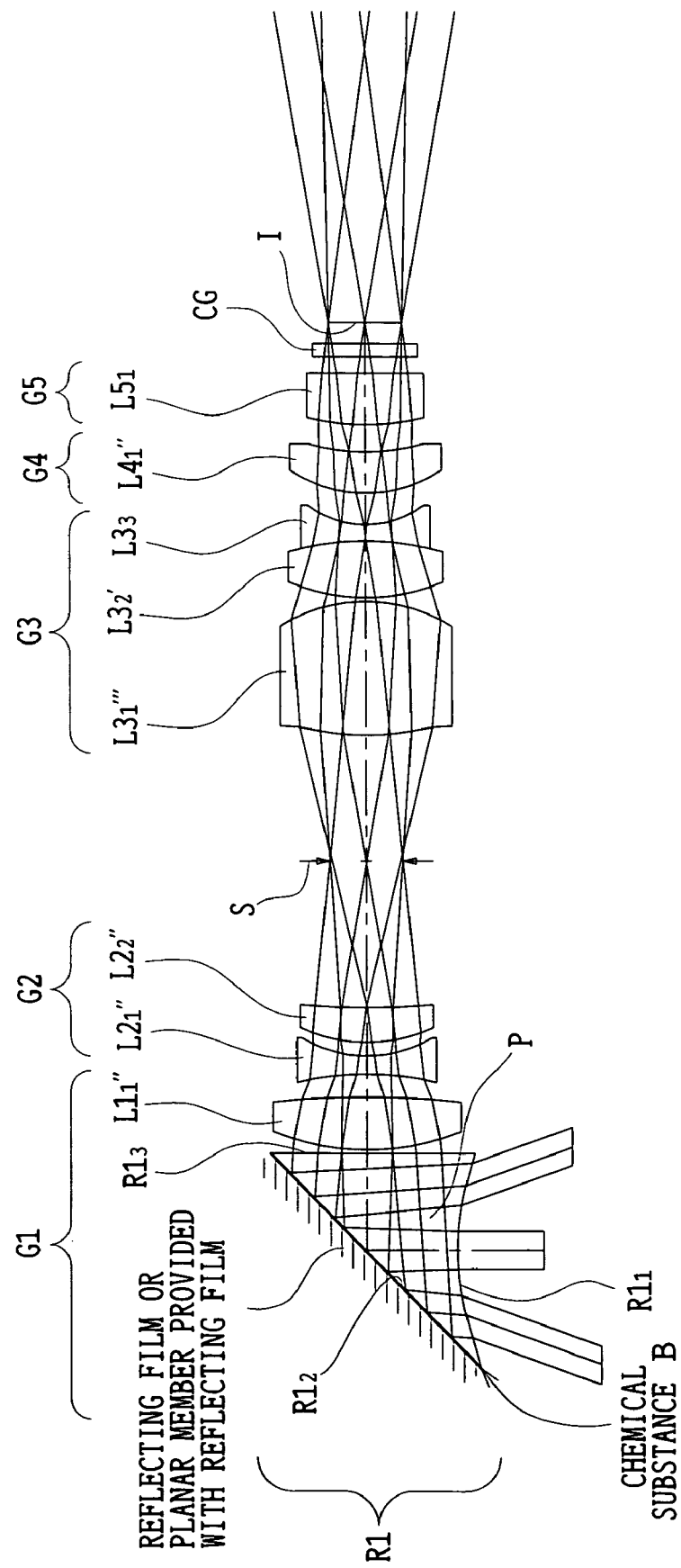

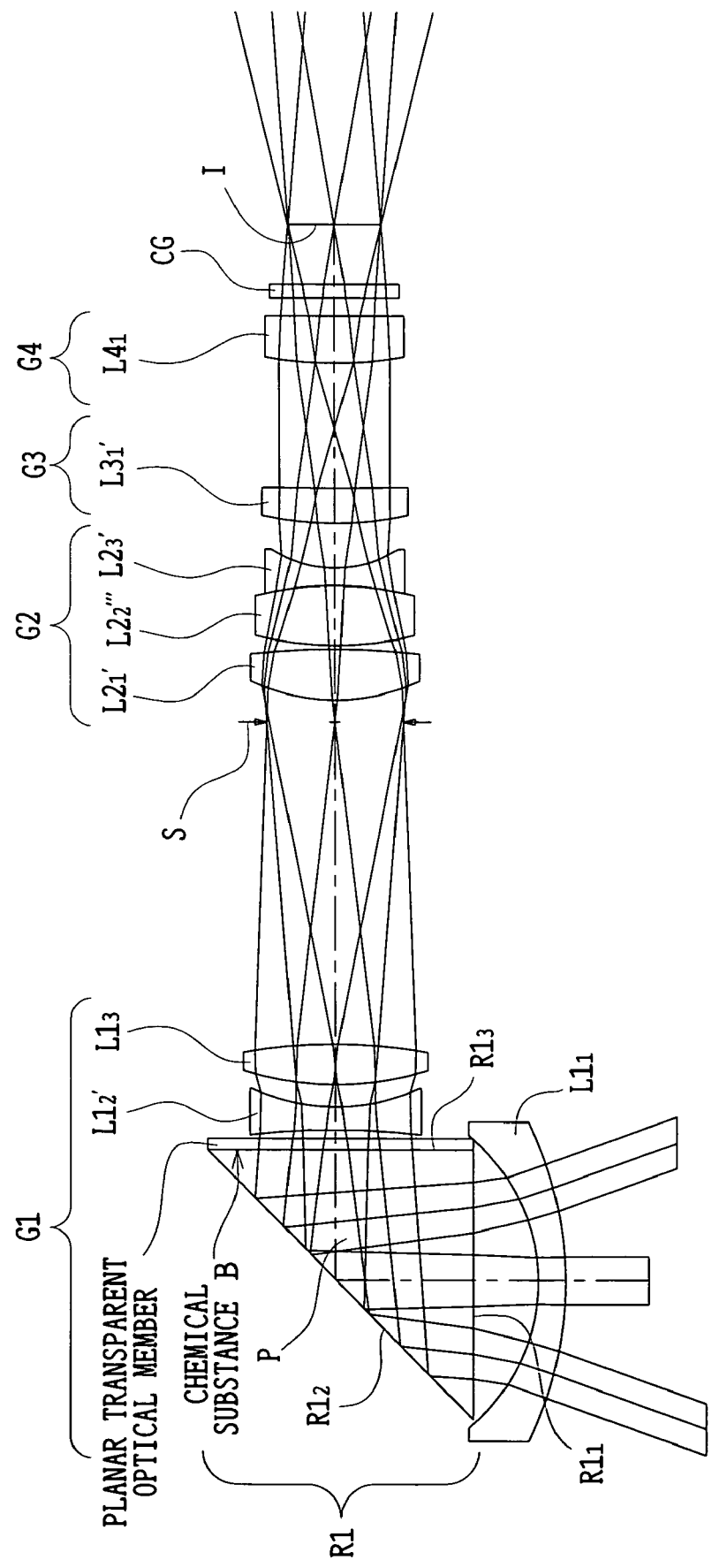

ELECTRONIC IMAGING APPARATUS

BACKGROUND OF THE INVENTION

1. Field of the Invention

The present invention relates to an electronic imaging apparatus in which control of light quantity is carried out by a system in which the internal transmittance of an optical system is changed instead of a system in which the diameter of an opening of an aperture stop is changed, among conventional systems for controlling quantity of light.

2. Description of the Related Art

In electronic imaging apparatus including the latest digital camera, miniaturization and thinning of it have been progressing. Such miniaturization and thinning are largely owing to miniaturization of an electric circuit and a recording medium.

As a result of the miniaturization of the electric circuit and the recording medium, the proportion of the size to the whole imaging apparatus of the optical system has been increasing relatively. Then, the miniaturization is being made through the miniaturization of an image sensor about an optical system, especially in a zoom lens. For example, the miniaturization and the thinning have been carried out by using mechanical means such as so-called collapsible barrel in which an optical system is pushed out at the time of photographing and is contained inside of the case of an electronic imaging apparatus at the time of carrying it.

However, as the miniaturization progresses, limit in miniaturizing whole optical system in proportion to progress of miniaturization of an image sensor has arisen, because of the limit of physical processing of lens element constituting an optical system, the limit of the strength of mechanism and the limit of manufacture accuracy, etc.

Then, reduction of constituent elements to utmost limit has been attempted by using an a spherical surface and glass material having high refractive index and low dispersion. However, it has also reached at the limit on keeping of basic specification and correction of aberrations.

Therefore, miniaturization of the volume and whole length of an optical system and thinning profile in the depth direction at the collapsed state mentioned above have already reached at the limit in such conventional constitution that optical elements are arranged along a straight line.

Then, as a method of realizing of thin profile to depth direction especially, a method using a reflective surface for bending an optical path in an optical system has been proposed.

It has also been proposed that in order to simplify mechanism, for example, two or more electrochromic elements where the wavelength ranges of the plurality of penetration light differ each other are used by combining them instead of an optical filter or a dichroic mirror, (refer to Japanese Examined Patent Application Publication Toku Kou Hei No.5-27083 and Japanese Unexamined Patent Application Publication No. Toku Kou Hei No.11-160739).

SUMMARY OF THE INVENTION

An electronic imaging apparatus according to the present invention comprises a first optical element having at least one reflective surface or having at least one flat surface and two transparent surfaces, chemical substance which enables to change light transmittance by chemical change according to electric quantity, a second optical element having a transparent surface and a reflective surface, and an optical system having an optical component which is arranged so as to sandwich the chemical substance by one of surfaces of the first optical element and one of surfaces of the second optical element.

In the electronic imaging apparatus according to the present invention, it is desirable that the spectrum transmittance satisfies the following condition at whole range of $\tau_{min} \leq \tau 520 \leq \tau_{max}$ and the whole transmittance of the first optical element, the chemical substance and the second optical element at the wavelength of 520 nm is $\tau 520$, $$0.70 < \tau 440/\tau 520 < 1.20$$

$$0.80 < \tau 600/\tau 520 < 1.30$$

where $\tau x$ (x is a number) is the transmittance at the wavelength of x nm.

The electronic imaging apparatus according to the present invention, it is desirable that it comprises the optical system and an electronic imaging element wherein the following condition is satisfied:

$$F > a (a \leq 3.5/\mu m)$$

where F is fully opened F value of the said optical system where a focal length is in the shortest state, and reference symbol a represents a pixel pitch (micrometer) of a picture element in the horizontal or the vertical direction of the electronic imaging element which converts an object image obtained through the optical system into an electric signal.

The electronic imaging apparatus according to the present invention, it is desirable that a lens group at the utmost image side in the optical system is fixed when magnification is changed. The electronic imaging apparatus according to the present invention, it is desirable that a lens group at the utmost image side in the optical system is constituted, as a whole, with one lens component, and one of the optical elements having a refractive power constituting the lens component is the first optical element. The electronic imaging apparatus according to the present invention, it is desirable that a movable group at the utmost image side in the optical system has focusing function.

It is desirable that the electronic imaging apparatus according to the present invention comprises a prism and at least one reflective surface for bending an optical path.

It is desirable that in the electronic imaging apparatus according to the present invention, the first optical element is the prism, the chemical substance is arranged so as to be contacted with one of the flat surface of the prism, and the second optical element is arranged so that the flat surface of the second optical element is contacted with the chemical substance from an opposite side of the prism and, one of the optical surfaces of the second optical element is constituted as a reflecting surface for bending the optical path.

It is desirable that in the electronic imaging apparatus according to the present invention, the optical system is constituted with a zoom lens.

It is desirable that in the electronic imaging apparatus according to the present invention, the thickness from the surface top of the utmost object side to an imaging position of the zoom lens is less than 20 mm in the state that the zoom lens is collapsed in the electronic imaging apparatus.

It is desirable that the electronic imaging apparatus according to the present invention comprises a prism and at least one reflecting surface for bending an optical path at the object side than the lens of the utmost object side in all group which is movable when magnification is changed.

It is desirable that in the electronic imaging apparatus according to the present invention, the prism is arranged, developed along the optical path from the object, at the utmost object side in the optical system.

It is desirable that in the electronic imaging apparatus according to the present invention; a surface of the prism at the utmost object side developed along the optical path from the object is concave.

It is desirable that in the electronic imaging apparatus according to the present invention, the optical system comprises at least a lens group having positive refracting power, which moves monotonously toward the object side when the magnification is changed from the wide angle end to the telephoto end.

It is desirable that in the electronic imaging apparatus according to the present invention, the lens group is constituted with two groups having three lenses, where a positive lens and a cemented lens having a positive lens and a negative lens are arranged in order from the object side.

It is desirable that in the electronic imaging apparatus according to the present invention; the lens group is arranged at the image side than an aperture stop side.

It is desirable the electronic imaging apparatus according to the present invention comprises the aperture stop whose position in the direction of the optical axis is fixed when magnification is changed and a lens group having negative refracting power which moves toward the object side than the aperture stop side when magnification is changed.

It is desirable that in the electronic imaging apparatus according to the present invention, the lens group having negative refractive power is constituted, in order from the object side, with a double concave lens and a positive lens.

It is desirable that in the electronic imaging apparatus according to the present invention, the refraction index of the prism is 1.68 or more than 1.68.

It is desirable that the electronic imaging apparatus according to the present invention comprises means for controlling electrically an electric signal in relation with a picture image obtained from a state of the optical system and the imaging element, and transmittance of the medium respectively.

The electronic imaging apparatus according to the present invention comprises a first optical element having a flat surface and a surface with refracting power, or a flat surface and a reflecting surface, a chemical substance which enables to change light transmittance by chemical change according to electric quantity, a second optical element having a transparent surface or a reflecting surface and a flat surface, and an optical system having an optical component arranged so as to sandwich the chemical substance by the flat surface of the first optical element and the flat surface of the second optical element.

It is desirable that in the electronic imaging apparatus according to the present invention, the first optical element is either one of a lens having a surface with refracting power and a flat surface, a lens consisting of only surfaces with refracting power, a prism or a shape variable mirror.

It is desirable that in the electronic imaging apparatus according to the present invention, the second optical element is either one of a parallel plane board, a lens having a surface with refracting power and a flat surface, or a lens consisting of only surface with refracting power.

It is desirable that in the electronic imaging apparatus according to the present invention, an optical system satisfying the following condition is used:

$$-0.05 < (R_A - R_C)/(R_A + R_C) < 0.05$$

where $R_A$ is a curvature radius of the surface of the first optical element contacted with the chemical substance and $R_C$ is a curvature radius of the surface of the second optical element contacted with the chemical substance.

According to the present invention, a thin-type electronic imaging apparatus which is small sized, particularly very thin in the depth direction, and enables to adjust light quantity in sufficiently wide range can be provided.

These and other features and advantages of the present invention will become apparent from the following detailed description of the preferred embodiments when taken in conjunction with the accompanying drawings.

BRIEF DESCRIPTION OF THE DRAWINGS

FIG. 8 is a sectional vies showing an optical arrangement, developed along the optical axis, at the wide-angle position, in focusing of the infinite object point, when an optical path is bent, about the sixth embodiment of an electronic imaging apparatus according to the present invention.

FIG. 10 is a sectional vies showing an optical arrangement, developed along the optical axis, at the wide-angle position, in focusing of the infinite object point, when an optical path is bent, about the eighth embodiment of an electronic imaging apparatus according to the present invention.

DETAILED DESCRIPTION OF THE PREFERRED EMBODIMENTS

Prior to the explanation of embodiments, the action and effect of the present invention will be explained.

The said chemical substance B is, for example, a chemical substance in an electrochromic element.

This chemical substance is extremely thin in itself and it can be incorporated in an optical system only by being sandwiched with glass flat plates from both sides.

However, in such constitution, if a glass flat plate is used, some of the space is occupied for the thickness of it.

However, if a part of optical elements in the optical system is made to play a role of glass flat plate instead of sandwiching the chemical substance B by the glass flat plates as shown in the present invention, the space for the thickness to be used for glass flat plates at both sides of the chemical substance B becomes unnecessary, and futility can be excluded.

For example, as an optical element A, an optical element which has a surface having refracting power and a flat surface respectively like a flat-convex lens or a flat-concave lens, is used. On the other hand, a parallel plane board is used as an optical element C.

Figure 1A:
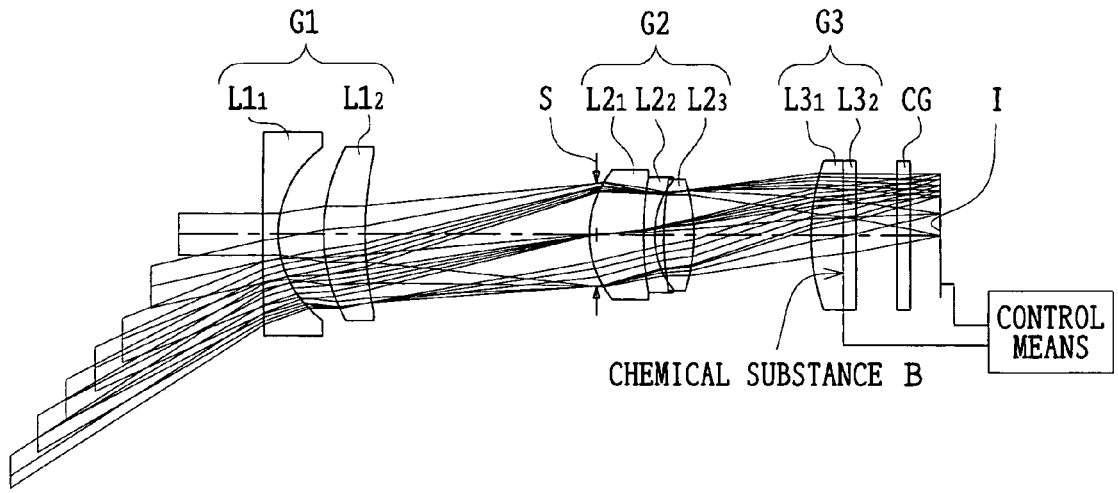
FIGS. 1A, 1B and 1C are sectional views showing an optical arrangement, developed along the optical axis, at the wide angle, middle and telephoto positions, respectively, in focusing of the infinite object point, about the first embodiment of an electronic imaging apparatus according to the present invention.
Figure 1B:
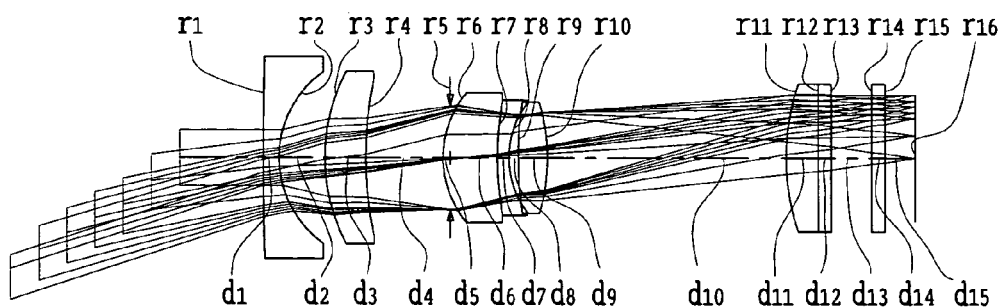
Figure 1C:
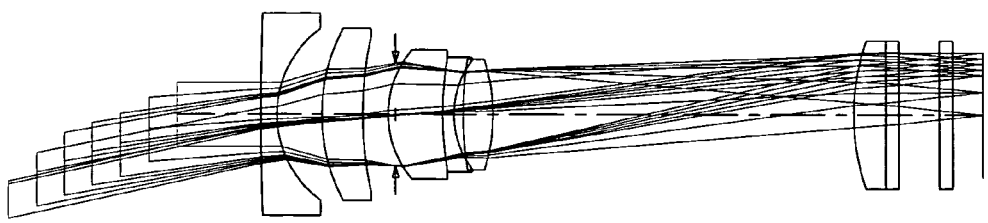
Figure 1D:
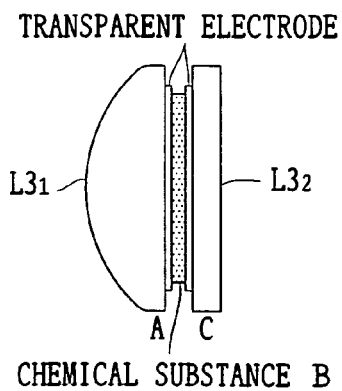
FIG. 1D is an enlarged detailed view showing the third lens group of the electronic imaging apparatus shown in FIG. 1A.

And by constituting that the chemical substance B is sandwiched between the flat surface of the optical element A and the flat surface of the optical element C, it is not necessary to use two sheets of transparent flat board for the purpose of sandwiching only the chemical substance B (refer to FIG. 1D).

The surfaces sandwiching the chemical substance B do not need to be flat.

For example, it is supposed that a flat-concave lens is used as the optical element A and a flat-convex lens is used as the optical element C.

In this case, the convex surface of the optical element A and the concave surface of the optical element C are faced each other and the chemical substance B can be sandwiched between them.

It is much better that the radius of curvature of the convex surface and that of the concave surface are approximately equal.

In such constitution, it is desirable that the following condition (1) is satisfied:

$$-0.05 < (R_A - R_C)/(R_A + R_C) < 0.05 \quad (1)$$

where $R_A$ is the radius of curvature of the surface of the optical element A contacted with the chemical substance B, and $R_C$ is the radius of curvature of the surface of the optical element C contacted with the chemical substance B.

If the condition (1) is satisfied, unevenness of light quantity can be suppressed small because the difference between the thickness of the chemical substance B near the optical axis and the thickness of the chemical substance B at the position distant from the optical axis does not occur.

In addition, as seen in the present invention, when sandwiching the chemical substance by the optical element A and the optical element C, it is good to dispose a transparent electrode between the chemical substance B and the optical element A, and between the optical element C and the chemical substance B like the case where the chemical substance B is sandwiched by transparent flat plates.

In the present invention, color reproduction when transmittance is changed can be secured if the spectrum of transmittance of the optical element A, the chemical substance B and the optical element C as a whole are set to be within a predetermined range.

It is good that the transmittance spectrum satisfies the following conditions (2) and (3) in the whole range of $\tau\text{min} \leq \tau 520 \leq \tau\text{max}$, where the transmittance of the light with wavelength of 520 nm when passing the optical element A, the chemical substance B and the whole optical element C is $\tau 520$.

$$0.70 < \tau 440/\tau 520 < 1.20 \quad (2)$$

$$0.80 < \tau 600/\tau 520 < 1.30 \quad (3)$$

where $\tau x$ (x is a number) is the transmittance of the light of wavelength x nm. That is, $\tau 440$ is the transmittance of the light with wavelength of 440 nm, and $\tau 600$ is the transmittance of the light with wavelength of 600 nm.

Here, $\tau\text{min}$ is the minimum transmittance when the chemical substance is in the most opaque state and $\tau\text{max}$ is the maximum transmittance when the chemical substance is in the most transparent state.

Figure 14:
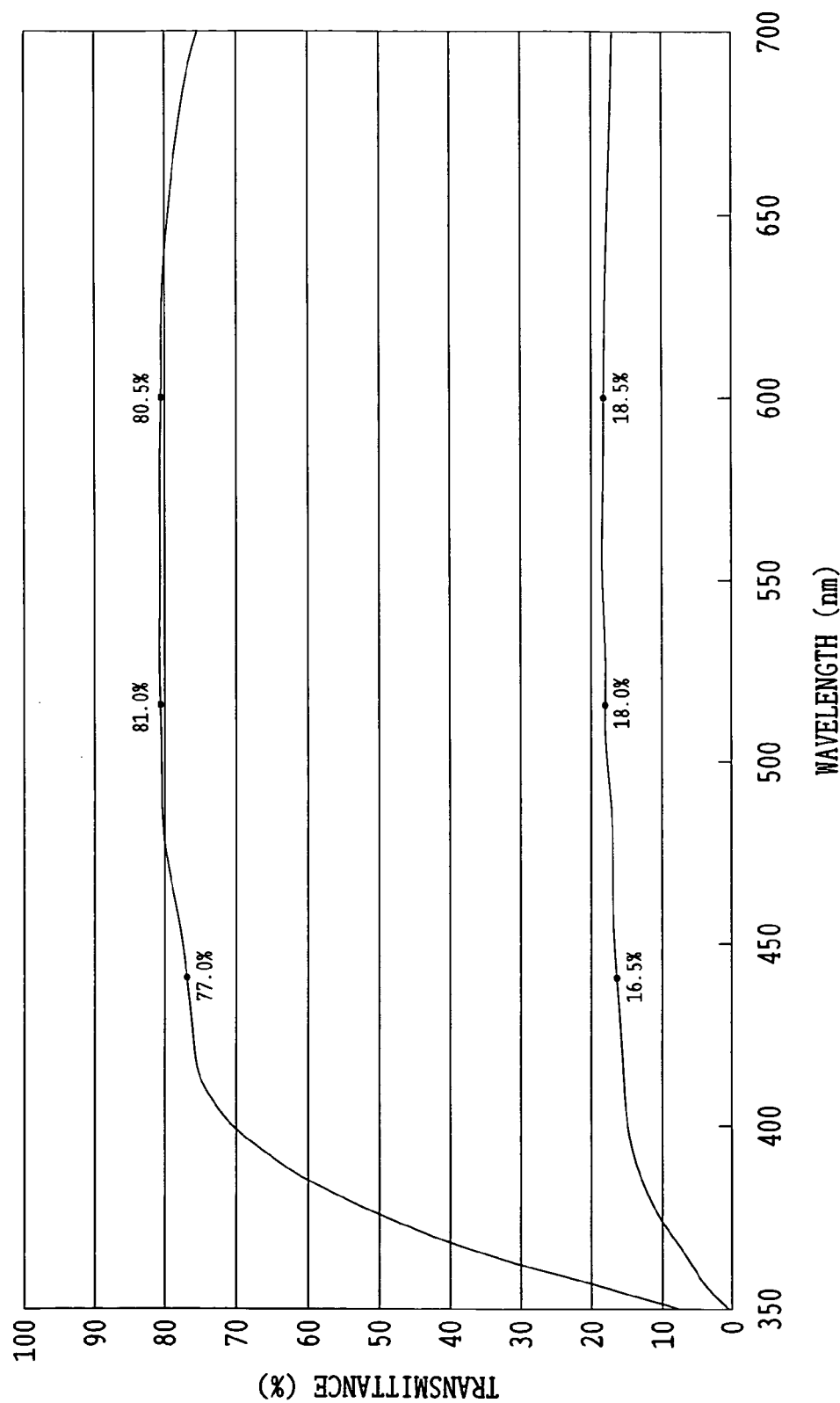
FIG. 14 is a graph showing spectral characteristics of electrochromic element using a media used as chemical substance B of the present invention in each embodiment according to the present invention.

Here, $\tau\text{min}$ and $\tau\text{max}$ will be explained. For example, an electrochromic element as the chemical substance B becomes in the state where transmittance is high, and the state where transmittance is low, as shown in FIG. 14 by applying two different predetermined voltages.

Here, in the state where transmittance is the highest, the electrochromic element is in the most transparent state.

On the other hand, in the state where transmittance is the lowest, the electrochromic element is in the most opaque state.

Therefore, $\tau\text{min}$ is the minimum transmittance when the chemical substance B is in the most opaque state, and $\tau\text{max}$ is the maximum transmittance when the chemical substance B is in the most transparent state.

For example, in case that $\tau\text{min} \leq \tau 520 \leq \tau\text{max}$, $\tau\text{min}$ is the minimum transmittance at the wavelength of 520 nm when the chemical substance B is in the most opaque state.

And $\tau\text{max}$ is the maximum transmittance at the wavelength of 520 nm when the chemical substance B is in the most transparent state.

It is desirable that the ranges of the conditions mentioned above are satisfied, since it does not bring difficulty to prepare a color balance, and the noise by adjustments of quality of image such as a color balance, etc. does not increase.

FIG. 14 shows an example of the characteristics of τmin and τmax at the wavelength band in 350 nm-700 nm.

In FIG. 14, an upper graph (77.0%, 81.0%, 80.5%) shows the situation of τmax, and a lower graph (16.5%, 18.0%, 18.5%) shows the situation of τmin.

Furthermore, it is much better to satisfy the following conditions (2') and (3').

$$0.75 < \tau 440/\tau 520 < 1.15 \quad (2')$$

$$0.85 < \tau 600/\tau 520 < 1.25 \quad (3')$$

Furthermore, it is much more desirable that the following conditions (2") and (3") are satisfied.

$$0.80 < \tau 440/\tau 520 < 1.10 \quad (2'')$$

$$0.90 < \tau 600/\tau 520 < 1.20 \quad (3'')$$

Although infrared cut coating may be made on the optical element A or the optical element C, the said conditions (2) and (3) specify the conditions about the transmittance before the coating is made.

$$0.60 < \tau 600/\tau 520 < 1.00 \quad (3a)$$

In case that an infrared cut coating is made to the optical element A or the optical element C, it is good to satisfy the following condition (3a) instead of the condition (3).

$$0.60 < \tau 600/\tau 520 < 1.00 \quad (3a)$$

It is much better to satisfy the following condition (3a').

$$0.65 < \tau 600/\tau 520 < 0.95 \quad (3a')$$

Furthermore, it is much more desirable that the following (3a") is satisfied.

$$0.70 < \tau 600/\tau 520 < 0.90 \quad (3a'')$$

Otherwise, in case that an infrared absorbent material is used as the optical element A or the optical element C, it is good to satisfy the following condition (3b) instead of the condition (3).

$$0.40 < \tau 600/\tau 520 < 0.80 \quad (3b)$$

It is much better to satisfy the following condition (3b').

$$0.45 < \tau 600/\tau 520 < 0.75 \quad (3b')$$

Furthermore, it is much more desirable that the following condition (3b") is satisfied.

$$0.50 < \tau 600/\tau 520 < 0.70 \quad (3b'')$$

In the imaging apparatus of the present invention, an electronic imaging element having so fine pixel pitch that influence of diffraction cannot be disregarded is used for the propose of the miniaturization.

In general, the influence of the diffraction affecting on the quality of image cannot be neglected when the following condition (4) is realized, where F represents fully opened F value at the shortest focal length of an optical system and reference symbol a (μm) represents a pixel pitch in the vertical or horizontal direction of an electronic imaging element.

$$F > a (a \leq 3.5 \, \mu m) \quad (4)$$

However, if the light quantity control system according to the present invention mentioned above is used, the influence of the diffraction on the quality of image in case that the condition (4) is satisfied can be effectively reduced.

It is more effective in case that the following condition (4') is satisfied.

$$F > 1.2 \cdot a (a \leq 3.5) \quad (4')$$

Furthermore, it is much more effective in case that the following condition (4") is satisfied.

$$F > 1.4 \cdot a (a \leq 3.5) \quad (4'')$$

Next, explanation will be made with respect to optical systems.

Since connection with lines is needed for the optical elements A and C in order to apply voltage to the said chemical substance B through the said transparent electrodes, it is desirable that they are not moved as much as possible in magnification or focusing.

It is most efficient to fix a lens group which is at the utmost image side in lens groups having refracting power, in view points of the easiness of correction of aberration and ensuring of the space for arranging optical elements. This is the same in the case of a single focal lens system (optical system not having magnification changing function) and in the case of a zoom lens system (optical system having magnification changing function).

Accordingly, in the present invention, a lens group which is at the utmost image side group in a single focal lens system or in a zoom lens system is fixed when magnification is changed, and this lens group consists of only one lens component. And this lens component is constituted to comprise an optical element having refracting power, and the role of the optical element A is given to one of optical elements having refracting power. The lens group which is at the utmost image side may be a lens component or a single lens itself. The optical element C can be a lens, an optical element having a reflective surface, an optical low pass filter, etc. In addition, it is better to carry out focusing by a lens group which is at the image side as much as possible. By this way, its mechanism can be simple and moreover, degradation of performance by focusing can be reduced.

Therefore, in the present invention, when an optical system has a movable group, it is good to give focusing function to a movable group which is at the utmost image side among movable groups.

It is desirable that particularly in the constitution having the last lens group which is always fixed, focusing function is given to a lens group arranged just before the last lens group. In the present invention, the chemical substance B in which the transmittance of light can be changed by chemical change according to amount of electricity is used also in constitution where the optical path is bent in order to make thin thickness in the depth direction of an electronic imaging apparatus.

Concretely, the optical element A is used as a prism and the chemical substance B is arranged so as to contact with one of flat surfaces of this prism. And the optical element C is arranged so that the flat surface of the optical element C contacts to the chemical substance B from the opposite side of the prism. Furthermore, one of optical surfaces of the optical element C is used as a reflective surface. In this way, an optical system having a bent optical path can be realized by using a prism (optical element A) and an optical element (optical element C) having at least one reflective surface. Moreover, adjustment of light quantity can be carried out by the chemical substance B.

By this arrangement, light passes the chemical substance B twice and the ratio of the maximum value and the minimum value of the transmittance of whole optical system becomes approximately sequre Accordingly, light quantity control range can be extended largely.

Since, at present, a zoom lens is mainly used as an optical system for small electronic imaging apparatus, it is good to apply the light quantity control system of the present invention mentioned above to a zoom lens.

In the zoom lens, as mentioned above, it has become one of mainstreams to adopt the so-called collapsible barrel type in which an optical system is projected out of camera body at the time of photographing and is contained at collapsed state in camera body at the time of carrying. However, it is in a difficult situation to make thin profile at the time that the lens body is at collapsed state due to restrictions of the space for a shutter, an aperture stop, a filter, etc.

If the light quantity control system of the present invention mentioned above is used also in the zoom lens, the depth of an optical system when the electronic imaging apparatus is at collapsed state (the thickness from surface top at the utmost object side of an optical system to an image forming position) can be less than 20 mm.

Also in the zoom lens, it is another main stream to apply an optical system having bent optical path. Particularly, the optical system comprising a prism and at least one reflective surface for bending an optical path which are at the object side than the position of movable groups arranged at the utmost object side is mainly in use.

Then, the constitution of the present invention is applicable also to the zoom lens having such constitution mentioned above.

In the constitution in this case, as same as mentioned above, a prism is used as an optical element A, and the chemical substance B is arranged so as to contact with one of flat surfaces of the prism.

And the optical element C is arranged so that a flat surface of the optical element C may contact with the chemical substance B from the opposite side of the prism.

Furthermore, one of optical surfaces of the said optical element C is made as a reflective surface.

In order that thickness in the depth direction is made thin, it is necessary that a point of bending an optical path is set closely, as much as possible, to the incident surface of the optical system.

For this reason, in the present invention, it is good that a prism is arranged, along the optical path from the object, at the utmost object side of the optical system. In this case, it is good that a surface of the prism which is at the utmost object side along the optical path (incident surface) is concave in order that an incidence pupil position is made shallow and a prism is miniaturized as much as possible.

In the case of a zoom lens, it is good that it comprises at least a lens group B having refracting power which moves to the object side monotonuesly when magnification is changed from a wide angle end to a telephoto end. Thus, by such constitution, an incidence pupil position can be made shallow and a prism can be miniaturized.

In this case, it is good that the lens group B is constituted with two groups with three lenses where a positive lens and a cemented lens having a positive lens and a negative lens are arranged in order from the object side. By such constitution, magnification efficiency by movement of the lens group B can be improved and manufacture error can be less influenced. It is better that the lens group B is arranged at an image side than an aperture stop, in viewpoint of making an incidence pupil shallow.

Furthermore, it is good that the position of the aperture stop at the optical axis remains fixed when magnification is changed. By this way, mechanism such as a shutter for exposure besides the aperture stop do not need to move when magnification is changed, and accordingly it is advantageous for miniaturization. If the position of the aperture stop is fixed, magnification range movable in the lens group B will narrow. In this case, a required magnification range can be secured, if the lens group which has negative refracting power and moves when magnification is changed, is arranged at the object side than the aperture stop.

In this case, it is good that the lens group having negative refracting power is constituted with a small number of lenses as much as possible, as it is constituted with only two lenses which are a double convex lens and a positive lens arranged in order from the object side. By such constitution, the space for movement of a lens can be secured.

In addition, in the present invention, it is better that the index of refraction of the said prism in an optical system having bent optical path is higher as much as possible, more than 1.68 (it is better when it is more than 1.75 and it is best if it is more than 1.80).

In the present invention, it is good that an electronic imaging apparatus is equipped with means to control electrically state of the said optical system, an electrical signal related to the image obtained from an electronic imaging element and a transmittance of the said medium respectively.

Hereafter, embodiments of the present invention will be explained using drawings.

The First Embodiment

FIGS. 1A, 1B and 1C are sectional views showing an optical arrangement, developed along the optical axis, at the wide-angle, middle and telephoto positions, respectively, in focusing of the infinite object point, about the first embodiment of an electronic imaging apparatus according to the present invention.

The electronic imaging apparatus of the first embodiment comprises in order from the object side an optical system containing an optical elements according to the present invention.

In FIG. 1, reference numeral I represents an image plane of CD that is an electronic imaging element and CG is a cover glass. Here, the aspect ratio of an effective imaging area is 3:4.

The optical system of the first embodiment comprises, in order from the object side, the first lens group G1, an aperture stop S, the second lens group G2 and the third lens group G3.

The first lens group G1 comprises, in order from an object side, a negative meniscus lens $L1_1$ having a convex surface directed to the object side and a positive meniscus lens $L1_2$ having a convex surface directed to the object side.

The second lens group G2 comprises, in order from the object side, a cemented lens $L2_2$ which is constituted with a positive meniscus lens $L2_1$ having a convex surface directed to the object side and a negative meniscus lens $L2_2$ having a convex surface directed to the object side, and a positive double convex lens $L2_3$.

The third lens group G3 comprises, in order from the object side, a positive lens $L3_1$ having a flat and a convex surface, the concave surface of which is directed toward the object side and the flat surface of which is directed toward the image side as an optical element A of a the present invention, and a double flat transparent glass plate $L3_2$ as an optical element C of the present invention.

One lens component as a whole, is constituted, where a medium (for example, chemical substance used in the electrochromic element with the spectrum characteristic shown in FIG. 14) in which transmittance of light varies by chemical change according to the amount of electricity as a chemical substance B of a the present invention is sandwiched between the flat plate of the positive lens $L3_1$ having a flat and concave surface and the opposite surface of the glass plate $L3_2$.

Moreover, a transparent electrode (illustration is not shown) is arranged between the positive lens $L3_1$ having a flat and a concave surface and the said medium, and between the said medium and the glass plate $L3_2$ respectively.

In case that the magnification is changed from a wide angle end to a telephoto end at focusing infinite object, it is constituted that the first lens group G1 moves once to the image side, and it moves to the object side, and then aperture stop S and the second lens group G2 move to the object side, and meanwhile the position of the third lens group G3 is fixed.

At the time of focusing operation, the third lens group G3 moves on the optical axis.

In addition, the electronic imaging apparatus of this embodiment is equipped with a control means which controls electrically the state of the said optical system, the electrical signal relevant to the image obtained from an electronic imaging element and the transmittance of the said medium respectively. This is the same also in each embodiment.

Next, numerical data of optical members constituting the electronic imaging apparatus of the first embodiment is listed below. In the numerical data, $r_1, r_2, ---$ denote in order from an object side radii of curvature of individual lens surfaces; $d_1, d_2, ---$ denote in order from an object side thickness of individual lenses or air space between them; $n_{d1}, n_{d2}, ---$ denote in order from an object side refractive indices of individual lenses at the d line; and $v_{d1}, v_{d2}, ---$ denotes in order from an object side Abbe's numbers of individual lenses. Fno denotes F number, f denotes whole focal length and D0 denotes the distance from an object to the first surface. The unit of r, d, f, and D0 is mm. Also, when z is taken as the coordinate in the direction of the optical axis, y is taken as the coordinate normal to the optical axis, K represents a conic constant, and $A_4, A_6, A_8$ and $A_{10}$ represent a spherical coefficients, the configuration of each of the a spherical surface is expressed by the following equation:

$$z=(y^2/r)/[1+\{1-(1+K)(y/r)^2\}^{1/2}]+A_4y^4+A_6y^6+A_8y^8+A_{10}y^{10}$$

These reference symbols hold for the numerical data of embodiments to be described later.

Numerical data 1

| | | | |
|---|---|---|---|
| $r_1 = 105.4577$ | $d_1 = 0.7000$ | $n_{d1} = 1.74320$ | $v_{d1} = 49.34$ |
| $r_2 = 3.9727$ (aspherical) | $d_2 = 2.0000$ | | |
| $r_3 = 7.8813$ | $d_3 = 1.8000$ | $n_{d3} = 1.84666$ | $v_{d3} = 23.78$ |
| $r_4 = 15.2512$ | $d_4 = D4$ | | |
| $r_5 = \infty$ (aperture stop) | $d_5 = -0.2989$ | | |
| $r_6 = 4.1711$ (aspherical) | $d_6 = 2.4000$ | $n_{d6} = 1.74320$ | $v_{d6} = 49.34$ |
| $r_7 = 14.0000$ | $d_7 = 0.5000$ | $n_{d7} = 1.84666$ | $v_{d7} = 23.78$ |
| $r_8 = 4.0392$ | $d_8 = 0.4000$ | | |
| $r_9 = 17.9917$ | $d_9 = 1.3000$ | $n_{d9} = 1.69680$ | $v_{d9} = 55.53$ |
| $r_{10} = -9.0360$ | $d_{10} = D10$ | | |
| $r_{11} = 10.0255$ | $d_{11} = 1.4000$ | $n_{d11} = 1.48749$ | $v_{d11} = 70.23$ |
| $r_{12} = \infty$ | $d_{12} = 0.6000$ | $n_{d12} = 1.48749$ | $v_{d12} = 70.23$ |
| $r_{13} = \infty$ | $d_{13} = D13$ | | |
| $r_{14} = \infty$ | $d_{14} = 0.6000$ | $n_{d14} = 1.51633$ | $v_{d14} = 64.14$ |
| $r_{15} = \infty$ | $d_{15} = D15$ | | |
| $r_{16} = \infty$ (image plane) | | | | aspherical coefficient

The second surface $K = 0$
$A_4 = -1.8236 \times 10^{-3}$    $A_6 = 2.4632 \times 10^{-5}$    $A_8 = -1.0007 \times 10^{-5}$
$A_{10} = 0$ -continued Numerical data 1

The sixth surface $K = 0$
$A_4 = -1.0581 \times 10^{-3}$    $A_6 = -2.1424 \times 10^{-5}$    $A_8 = -2.7764 \times 10^{-6}$
$A_{10} = 0$ Zoom data
D0 (the distance of the first surface from the object) is $\infty$.

| | wide angle end | middle | telephoto end |
|---|---|---|---|
| f (mm) | 4.53930 | 8.69240 | 12.90055 |
| Fno. | 2.5426 | 3.5056 | 4.4907 |
| D0 | $\infty$ | $\infty$ | $\infty$ |
| D4 | 10.23627 | 3.79486 | 1.50000 |
| D10 | 5.18649 | 10.56797 | 16.02634 |
| D13 | 1.80000 | 1.80000 | 1.80000 |
| D15 | 1.35264 | 1.35528 | 1.35529 |

The Second Embodiment

Figure 2A:
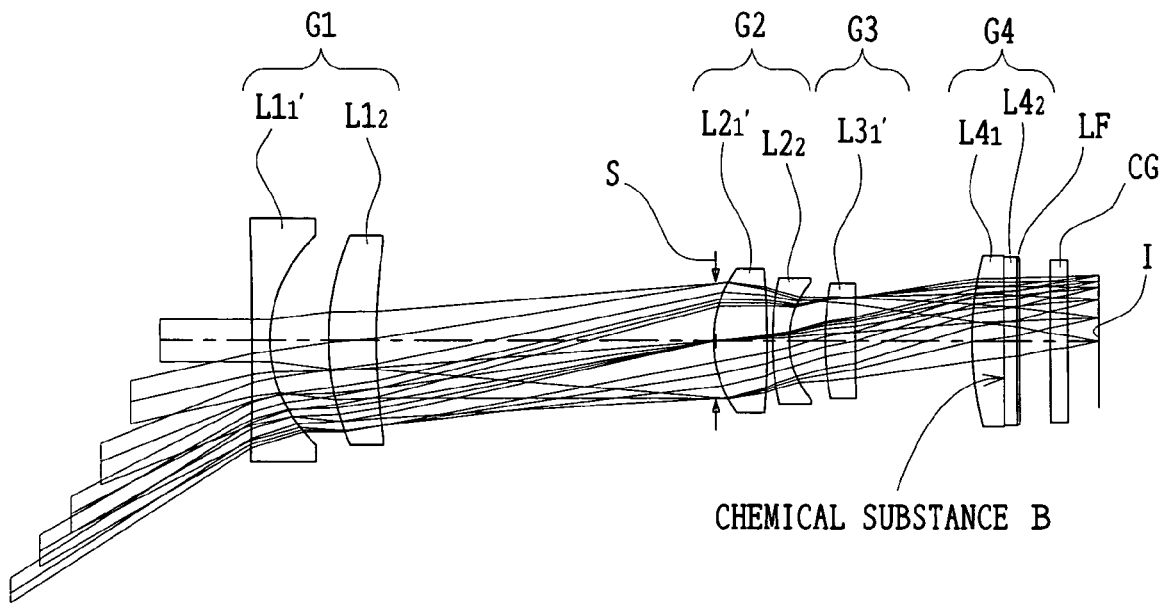
FIGS. 2A, 2B and 2C are sectional views showing an optical arrangement, developed along the optical axis, at the wide-angle, middle and telephoto positions, respectively, in focusing of the infinite object point, about the second embodiment of an electronic imaging apparatus according to the present invention.
Figure 2B:
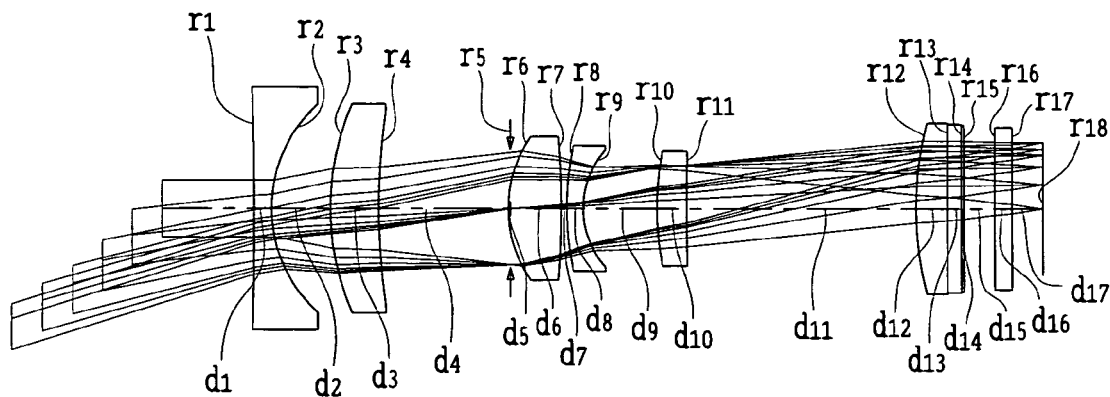
Figure 2C:
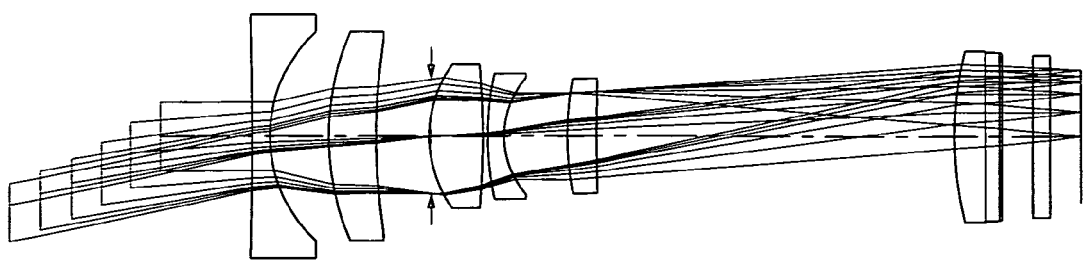

FIGS. 2A, 2B and 2C are sectional views showing an optical arrangement, developed along the optical axis, at the wide-angle, middle and telephoto positions, respectively, in focusing of the infinite object point, about the second embodiment of an electronic imaging apparatus according to the present invention.

The electronic imaging apparatus of the second embodiment comprises in order from the object side an optical system including optical component according to the present invention.

In FIG. 2, reference numeral I represents an image plane of CCD that is an electronic imaging element and CG is a cover glass. Here, the aspect ratio of an effective imaging area is 3:4.

The optical system of the second embodiment comprises, in order from the object side, the first lens group G1, an aperture stop S, the second lens group G2, the third lens group G3 and the fourth lens group G4.

The first lens group G1 comprises, in order from the object side, a double concave lens $L1_1$ having negative defraction power and a positive meniscus lens $L1_2$ having a convex surface directed to the object side.

The second lens group G2 comprises, in order from the object side, a double convex lens $L2_1$ having positive refracting power and a negative meniscus lens $L2_2$ having a convex surface directed to the object side.

The third lens group G3 comprises a positive meniscus lens L31 having a convex surface directed toward the object side.

The fourth lens group G4 comprises, in order from the object side, a positive lens $L4_1$ having a flat surface directed toward the image side and a convex surface directed toward the object side as an optical element A of a the present invention, a double flat transparent glass plate $L4_2$ as an optical element C of the present invention and a low pass filter LF.

Then, a medium (for example, chemical substance used in the electrochromic element with the spectrum characteristic shown in FIG. 14) in which transmittance of light varies by chemical change according to the amount of electricity as a chemical substance B of the present invention is sandwiched between the flat surface of the positive lens $L4_1$ having a flat and a concave surface and the opposite surface of the glass plate $L4_2$, and the glass plate $L4_2$ and low pass filter LF are cemented, whereby one lens component as a whole is constituted.

Moreover, a transparent electrode (illustration is not shown) is arranged between the positive lens L4$_1$ having a flat and a concave surface and the said medium, and between the said medium and the glass plate L4$_2$ respectively.

In case that the magnification is changed from a wide angle end to a telephoto end at focusing infinite object, it is constituted that the first lens group G1 moves to the object side once after having moved to the image side, and the aperture stop S and the second lens group G2 move to the object side, and the position of the third lens group G3 is moved toward the object side so as to narrow the distance from the second lens group once after having widened slightly the distance.

The position of the fourth lens group G4 remains fixed. At the time of focusing operation, the third lens group G3 moves on the optical axis.

Next, data of optical members constituting the electronic imaging apparatus of the second embodiment is listed below.

Numerical data 2

| | | | |
|---|---|---|---|
| r$_1$ = −150.1310 | d$_1$ = 0.7000 | n$_{d1}$ = 1.74320 | v$_{d1}$ = 49.34 |
| r$_2$ = 4.9004 (aspherical) | d$_2$ = 2.4176 | | |
| r$_3$ = 10.7774 | d$_3$ = 2.0000 | n$_{d3}$ = 1.84666 | v$_{d3}$ = 23.78 |
| r$_4$ = 26.6528 | d$_4$ = D4 | | |
| r$_5$ = ∞ | d$_5$ = 0.8000 | | |
| r$_6$ = ∞ (aperture stop) | d$_6$ = −0.1000 | | |
| r$_7$ = 4.6720 (aspherical) | d$_7$ = 2.2000 | n$_{d7}$ = 1.74320 | v$_{d7}$ = 49.34 |
| r$_8$ = −31.5317 | d$_8$ = 0.2000 | | |
| r$_9$ = 11.5148 | d$_9$ = 0.7000 | n$_{d9}$ = 1.84666 | v$_{d9}$ = 23.78 |
| r$_{10}$ = 3.5872 | d$_{10}$ = D10 | | |
| r$_{11}$ = 12.2101 | d$_{11}$ = 1.2000 | n$_{d11}$ = 1.69680 | v$_{d11}$ = 55.53 |
| r$_{12}$ = 60.4963 | d$_{12}$ = D12 | | |
| r$_{13}$ = 14.2283 (aspherical) | d$_{13}$ = 1.3000 | n$_{d13}$ = 1.74320 | v$_{d13}$ = 49.34 |
| r$_{14}$ = ∞ | d$_{14}$ = 0.6000 | n$_{d14}$ = 1.74320 | v$_{d14}$ = 49.34 |
| r$_{15}$ = ∞ | d$_{15}$ = 0.1000 | n$_{d15}$ = 1.51633 | v$_{d15}$ = 64.14 |
| r$_{16}$ = ∞ | d$_{16}$ = D16 | | |
| r$_{17}$ = ∞ | d$_{17}$ = 0.7500 | n$_{d17}$ = 1.51633 | v$_{d17}$ = 64.14 |
| r$_{18}$ = ∞ | d$_{18}$ = D18 | | |
| r$_{19}$ = ∞ (image plane) | d$_{19}$ = 0 | | | aspherical coefficient

The second surface

K = 0
A$_4$ = −1.0701 × 10$^{-3}$     A$_6$ = 5.8959 × 10$^{-6}$     A$_8$ = −2.3038 × 10$^{-6}$
A$_{10}$ = 0

The seventh surface

K = 0
A$_4$ = −1.0831 × 10$^{-3}$     A$_6$ = −2.1195 × 10$^{-5}$     A$_8$ = −2.0599 × 10$^{-6}$
A$_{10}$ = 0

The thirteenth surface

K = 0
A$_4$ = 6.5428 × 10$^{-7}$     A$_6$ = −4.8351 × 10$^{-5}$     A$_8$ = 2.5499 × 10$^{-6}$
A$_{10}$ = 0

Zoom data
D0 (the distance of the first surface from the object) is ∞.

| | wide angle end | middle | telephoto end |
|---|---|---|---|
| F (mm) | 4.50687 | 8.69376 | 12.89387 |
| Fno. | 2.6413 | 3.6209 | 4.5432 |
| D0 | ∞ | ∞ | ∞ |
| D4 | 13.30618 | 4.75184 | 1.50000 |
| D10 | 1.50000 | 3.08274 | 2.70000 |
| D12 | 4.74901 | 9.41971 | 14.70741 |
| D16 | 1.30000 | 1.30000 | 1.30000 |
| D18 | 1.27824 | 1.26808 | 1.27439 |

The Third Embodiment

Figure 3A:
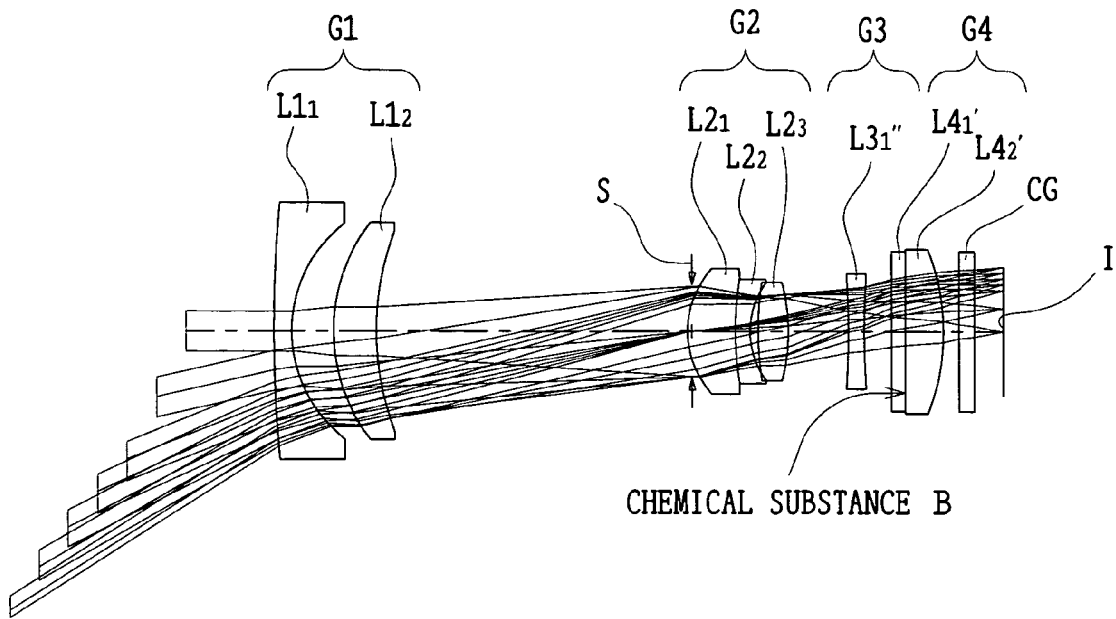
FIGS. 3A, 3B and 3C are sectional views showing an optical arrangement, developed along the optical axis, at the wide-angle, middle and telephoto positions, respectively, in focusing of the infinite object point, about the third embodiment of an electronic imaging apparatus according to the present invention.
Figure 3B:
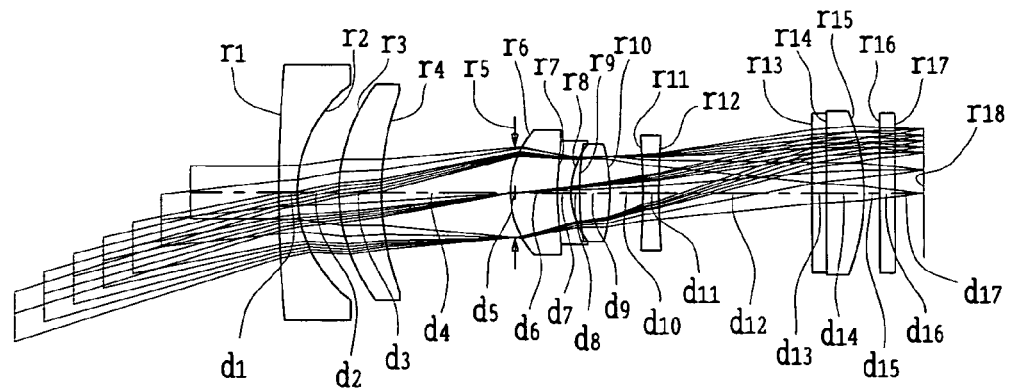
Figure 3C:
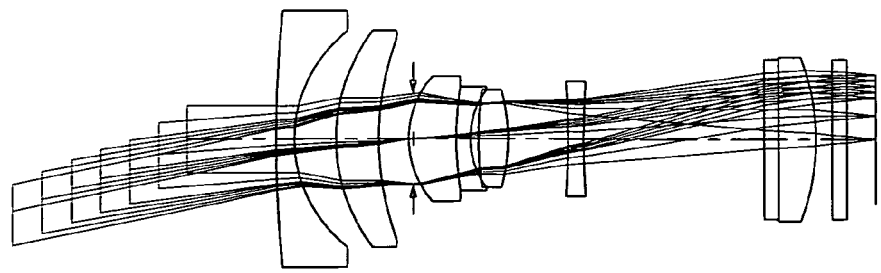

FIGS. 3A, 3B and 3C are sectional views showing an optical arrangement, developed along the optical axis, at the wide-angle, middle and telephoto positions, respectively, in focusing of the infinite object point, about the third embodiment of an electronic imaging apparatus according to the present invention.

The electronic imaging apparatus of the third embodiment comprises, in order from the object side, an optical system having optical component according to the present invention. In FIG. 3, reference numeral I represents an image plane of CCD that is an electronic imaging element and CG is a cover glass. Here, the aspect ratio of an effective imaging area is 3:4.

The optical system of the third embodiment comprises, in order from the object side, the first lens group G1, an aperture stop S, the second lens group G2 and the third lens group G3, the fourth lens group G4.

The first lens group G1 consists of a negative meniscus lens L1$_1$ having a convex surface directed to the object side and a positive meniscus lens L1$_2$ having a convex surface directed to the object side.

The second lens group G2 comprises, in order from the object side, a cemented lens L2$_2$ which is constituted with a positive meniscus lens L2$_1$ having a convex surface directed to the object side and a negative meniscus lens L2$_2$ having a convex surface directed to the object side, and a positive double convex lens L2$_3$.

The third lens group G3 comprises a negative double concave lens L3$_1$".

The fourth lens group G4 comprises, in order from the object side, a double flat transparent glass plate L41' as an optical element C of the present invention. And a medium (for example, chemical substance used in the electrochromic element with the spectrum characteristic shown in FIG. 14) in which transmittance of light varies by chemical change according to the amount of electricity as a chemical substance B of the present invention is sandwiched between the flat surface of the positive lens L4$_2$ having a flat and a concave surface and the opposite surface of the glass plate L4$_1$', whereby one lens component as a whole is constituted.

In case that the magnification is changed from a wide angle end to a telephoto end at focusing infinite object, it is constituted that the first lens group G1 moves once to the image side, and it moves to the object side and the aperture stop S and the second lens group G2 move to the object side, and meanwhile the third lens group G3 move to the object side so as to widen slightly the distance from the lens group 2 once after having narrowed the distance from the lens group 2.

Meanwhile the position of the fourth lens group G4 is remains fixed.

At the time of focusing operation, the third lens group G3 moves on the optical axis.

Next, data of optical members constituting the electronic imaging apparatus of the third embodiment is listed below.

Numerical data 3

| | | | |
|---|---|---|---|
| r$_1$ = 59.5785 | d$_1$ = 0.8000 | n$_{d1}$ = 1.74320 | v$_{d1}$ = 49.34 |
| r$_2$ = 5.2020 (aspherical) | d$_2$ = 1.7628 | | |
| r$_3$ = 7.4090 | d$_3$ = 1.8000 | n$_{d3}$ = 1.80518 | v$_{d3}$ = 25.42 |
| r$_4$ = 12.1145 | d$_4$ = D4 | | |
| r$_5$ = ∞ (aperture stop) | d$_5$ = −0.2000 | | |
| r$_6$ = 3.8043 (aspherical) | d$_6$ = 2.0000 | n$_{d6}$ = 1.80610 | v$_{d6}$ = 40.92 |
| r$_7$ = 14.5000 | d$_7$ = 0.6000 | n$_{d7}$ = 1.84666 | v$_{d7}$ = 23.78 |
| r$_8$ = 3.3540 | d$_8$ = 0.3500 | | |

-continued

Numerical data 3

| | | | |
|---|---|---|---|
| $r_9 = 12.6410$ | $d_9 = 1.3000$ | $n_{d9} = 1.77250$ | $v_{d9} = 49.60$ |
| $r_{10} = -8.3014$ | $d_{10} = 0.8126$ | | |
| $r_{11} = \infty$ | $d_{11} = D11$ | | |
| $r_{12} = -31.5077$ | $d_{12} = 0.6000$ | $n_{d12} = 1.80100$ | $v_{d12} = 34.97$ |
| $r_{13} = 24.0651$ | $d_{13} = D13$ | | |
| $r_{14} = \infty$ | $d_{14} = 0.6000$ | $n_{d14} = 1.74320$ | $v_{d14} = 49.34$ |
| $r_{15} = \infty$ | $d_{15} = 1.6000$ | $n_{d15} = 1.74320$ | $v_{d15} = 49.34$ |
| $r_{16} = -8.8748$ (aspherical) | $d_{16} = D16$ | | |
| $r_{17} = \infty$ | $d_{17} = 0.7000$ | $n_{d17} = 1.51633$ | $v_{d17} = 64.14$ |
| $r_{18} = \infty$ | $d_{18} = D18$ | | |
| $r_{19} = \infty$ (image plane) | $d_{19} = 0$ | | | aspherical coefficient

The second surface $K = 0$
$A_4 = -4.1214 \times 10^{-4}$   $A_6 = 5.9789 \times 10^{-6}$   $A_8 = -1.4243 \times 10^{-6}$
$A_{10} = 0$ The sixth surface $K = 0$
$A_4 = -1.1522 \times 10^{-3}$   $A_6 = -5.4640 \times 10^{-5}$   $A_8 = -1.6607 \times 10^{-6}$
$A_{10} = 0$ The sixteenth surface $K = 0$
$A_4 = 7.3474 \times 10^{-4}$   $A_6 = 1.3929 \times 10^{-5}$   $A_8 = -2.0651 \times 10^{-6}$
$A_{10} = 0$ Zoom data
D0 (the distance of the first surface from the object ) is ∞.

| | wide angle end | middle | telephoto end |
|---|---|---|---|
| F (mm) | 4.53596 | 8.69926 | 12.88691 |
| Fno. | 2.6768 | 3.7425 | 4.5083 |
| D0 | ∞ | ∞ | ∞ |
| D4 | 13.46349 | 5.72601 | 1.50000 |
| D11 | 1.72541 | 0.60000 | 1.78838 |
| D13 | 1.20000 | 6.55121 | 7.63629 |
| D16 | 0.70000 | 0.70000 | 0.70000 |
| D18 | 1.20758 | 1.18734 | 1.20631 |

The Fourth Embodiment

Figure 4:
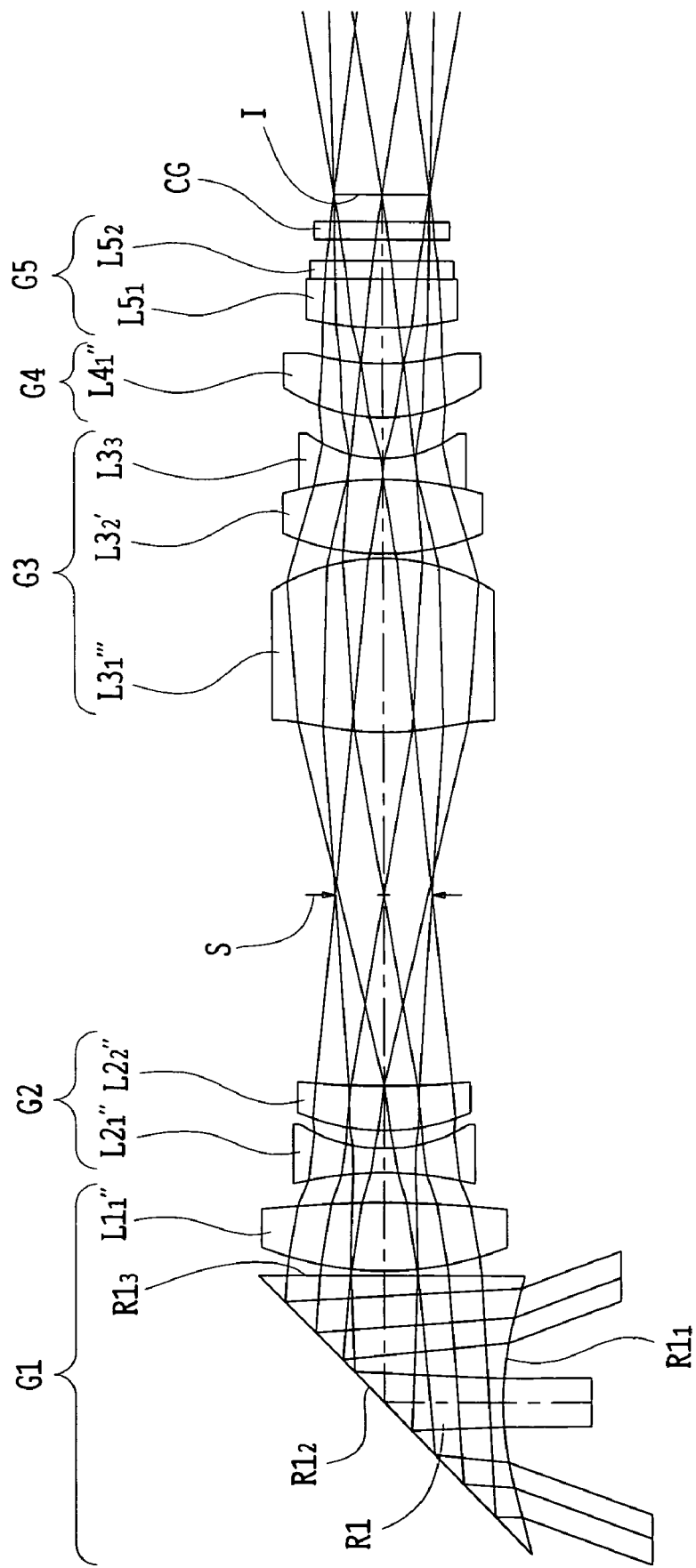
FIG. 4 is a sectional vies showing an optical arrangement, developed along the optical axis, at the wide-angle position, in focusing of the infinite object point, when an optical path is bent, about the fourth embodiment of an electronic imaging apparatus according to the present invention.
Figure 5A:
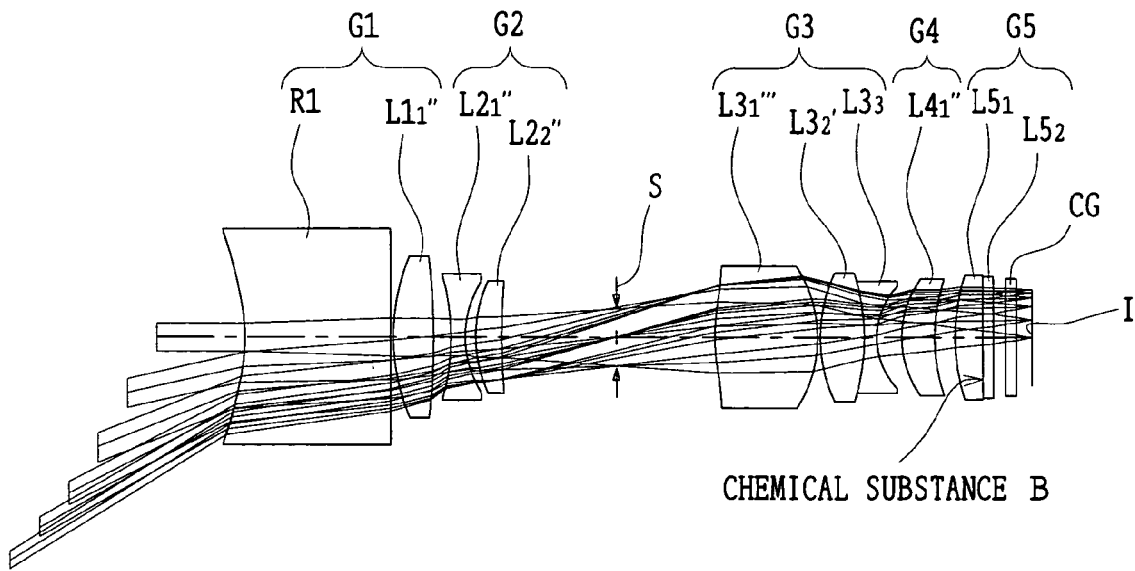
FIGS. 5A, 5B and 5C are sectional views showing an optical arrangement, developed along the optical axis, at the wide-angle middle and telephoto positions, respectively, in focusing of the infinite object point, about the electronic imaging apparatus shown in FIG. 4.
Figure 5B:
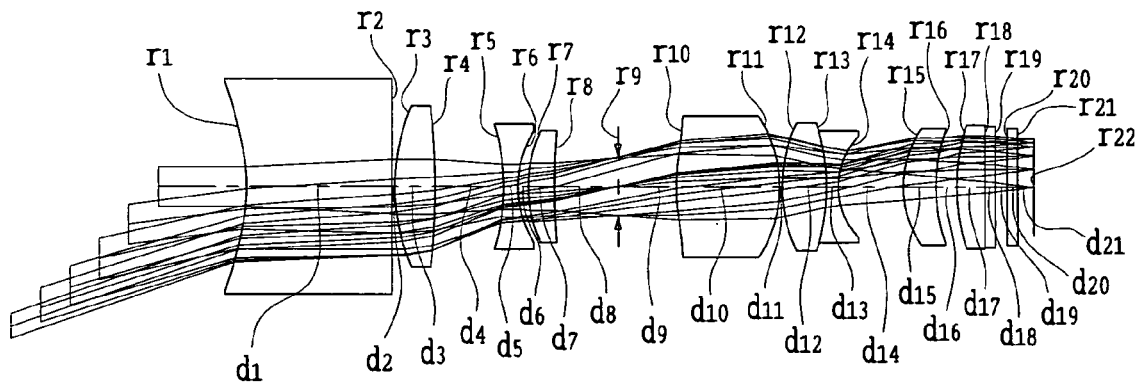
Figure 5C:
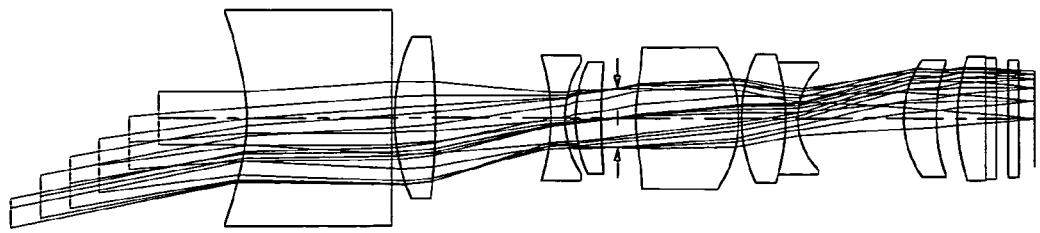

FIG. 4 is a sectional view showing an optical arrangement, developed along the optical axis, at the wide-angle position, in focusing at the infinite object point, when an optical path is bent, about the fourth embodiment of an electronic imaging apparatus according to the present invention. FIGS. 5A, 5B and 5C are sectional views showing an optical arrangement, developed along the optical axis, at the wide-angle, middle and the telephote end position, in focusing at the infinite object point of the electronic imaging apparatus shown in FIG. 4.

The electronic imaging apparatus of the fourth embodiment comprises in order from an object side an optical system having an optical component according to the present invention.

In FIGS. 4 and 5, reference numeral I represents an image plane of CCD that is an electronic imaging element and CG is a cover glass. Here, the aspect ratio of an effective imaging area is 3:4.

The optical system of the first embodiment comprises, in order from the object side, the first lens group G1, the second lens group G2, an aperture stop S, the third lens group G3, the fourth lens group G4 and the fifth lens group G5.

The first lens group G1 comprises, in order from an object side, a reflecting optical element R1 for bending an optical path and a double positive lens $L1_1''$.

The reflecting optical element R1 comprising an incident surface $R1_1$ and ann reflecting surface $R1_2$ for bending the optical path is constituted as an reflecting prism for bending the optical path by 90°. The incident surface is formed to be concave. The bending direction is tranverse direction.

The second lens group G2 comprises, in order from the object side, a double concave lens $L2_1''$ and a positive meniscus lens $L2_2''$, and it has negative refracting power as a whole.

The third lens group G3 comprises as the lens group B of the present invention mentioned above, in order from the object side, a positive double convex lens $L3_1'''$ and a cemented lens having a positive double convex lens $L3_2'$ and a negative double concave $L3_3$, and it has positive refracting power as a whole.

The fourth lens group G4 comprises a positive meniscus lens $4_1''$ having a convex surface directed toward the object side.

The fifth lens group G5 comprises, a positive lens $L5_1$ as an optical element A of a the present invention having a convex surface directed toward the object side and a flat surface directed toward the image side, and a transparent double glass plate $L5_2$ as an optical element C of a the present invention.

Then, a medium (for example, chemical substance used in the electrochromic element with the spectrum characteristic shown in FIG. 14) in which transmittance of light varies by chemical change according to the amount of electricity as the chemical substance B of the present invention is sandwiched between the flat surface of the positive lens $L5_1$ having a flat and concave surface and the opposite surface of the glass plate $L5_2$, whereby one lens component as a whole is constituted.

Moreover, a transparent electrode (illustration is not shown) is arranged between the positive lens $L5_1$ having a flat and a concave surface and the said medium, and between the said medium and the glass plate $L5_2$ respectively.

In case that the magnification is changed from a wide angle end to a telephoto end at focusing infinite object, it is constituted that the first lens group G1 is fixed, the second lens group G2 move to the image side, the aperture stop S is fixed, the third lens group G3 moves monotoneously to the object side and the fourth lens group G4 is fixed. The fifth lens group G5 always remains fixed.

At the time of focusing operation, it is constituted that the fourth lens group G4 moves on the optical axis.

Next, data of optical members constituting the electronic imaging apparatus of the fourth embodiment is listed below.

Numerical data 4

| | | | |
|---|---|---|---|
| $r_1 = -9.4859$ (aspherical) | $d_1 = 8.2000$ | $n_{d1} = 1.80518$ | $v_{d1} = 25.42$ |
| $r_2 = \infty$ | $d_2 = 0.1500$ | | |
| $r_3 = 9.6065$ (aspherical) | $d_3 = 2.3000$ | $n_{d3} = 1.78800$ | $v_{d3} = 47.37$ |
| $r_4 = -36.4986$ | $d_4 = D4$ | | |
| $r_5 = -12.3968$ (aspherical) | $d_5 = 0.8000$ | $n_{d5} = 1.74320$ | $v_{d5} = 49.34$ |
| $r_6 = 5.0858$ (aspherical) | $d_6 = 0.6000$ | | |
| $r_7 = 7.3484$ | $d_7 = 1.5000$ | $n_{d7} = 1.84666$ | $v_{d7} = 23.78$ |
| $r_8 = 29.6119$ | $d_8 = D8$ | | |
| $r_9 = \infty$ (aperture stop) | $d_9 = D9$ | | |
| $r_{10} = 10.5086$ (aspherical) | $d_{10} = 5.8760$ | $n_{d10} = 1.69350$ | $v_{d10} = 53.21$ |
| $r_{11} = -7.0163$ | $d_{11} = 0.1500$ | | |
| $r_{12} = 8.6746$ | $d_{12} = 2.4979$ | $n_{d12} = 1.51742$ | $v_{d12} = 52.43$ |
| $r_{13} = -12.1398$ | $d_{13} = 0.7000$ | | |
| $r_{14} = 4.2315$ | $d_{14} = D14$ | | |
| $r_{15} = 6.0862$ | $d_{15} = 1.8000$ | $n_{d15} = 1.48749$ | $v_{d15} = 70.23$ |

-continued

Numerical data 4

| | | | |
|---|---|---|---|
| $r_{16} = 9.5635$ | $d_{16} = D16$ | | |
| $r_{17} = 12.1887$ (aspherical) | $d_{17} = 1.6000$ | $n_{d17} = 1.80100$ | $v_{d17} = 34.97$ |
| $r_{18} = \infty$ | $d_{18} = 0.6000$ | $n_{d18} = 1.80100$ | $v_{d18} = 34.97$ |
| $r_{19} = \infty$ | $d_{19} = 0.7000$ | | |
| $r_{20} = \infty$ | $d_{20} = 0.6000$ | $n_{d20} = 0.51633$ | $v_{d20} = 64.14$ |
| $r_{21} = \infty$ | $d_{21} = D21$ | | |
| $r_{22} = \infty$ (image plane) | $d_{22} = 0$ | | | aspherical coefficient

The first surface $K = 0$
$A_4 = 9.5404 \times 10^{-4}$   $A_6 = -1.2031 \times 10^{-5}$   $A_8 = 1.1895 \times 10^{-7}$
$A_{10} = 0$ The third surface $K = 0$
$A_4 = -5.2340 \times 10^{-4}$   $A_6 = 1.2356 \times 10^{-6}$   $A_8 = 2.2489 \times 10^{-8}$
$A_{10} = 0$ The fifth surface $K = 0$
$A_4 = -8.7469 \times 10^{-4}$   $A_6 = 1.3456 \times 10^{-4}$   $A_8 = -5.7822 \times 10^{-6}$
$A_{10} = 0$ The sixth surface $K = 0$
$A_4 = -1.9294 \times 10^{-3}$   $A_6 = 1.9498 \times 10^{-4}$   $A_8 = -1.2402 \times 10^{-5}$
$A_{10} = 0$ The tenth surface $K = 0$
$A_4 = -8.4900 \times 10^{-4}$   $A_6 = -1.8004 \times 10^{-5}$   $A_8 = -2.1920 \times 10^{-6}$
$A_{10} = 0$ The eleventh surface $K = 0$
$A_4 = 2.4762 \times 10^{-4}$   $A_6 = -1.7028 \times 10^{-5}$   $A_8 = -1.8814 \times 10^{-7}$
$A_{10} = 0$ The seventeenth surface $K = 0$
$A_4 = 1.6647 \times 10^{-4}$   $A_6 = -6.3255 \times 10^{-6}$   $A_8 = -7.4085 \times 10^{-7}$
$A_{10} = 0$ Zoom data
D0 (the distance of the first surface from the object) is ∞.

| | wide angle end | middle | telephoto end |
|---|---|---|---|
| F (mm) | 4.60560 | 7.80020 | 13.19911 |
| Fno. | 2.8592 | 3.5822 | 4.5098 |
| D0 | ∞ | ∞ | ∞ |
| D4 | 0.99795 | 3.90838 | 6.57349 |
| D8 | 6.47497 | 3.55712 | 0.89929 |
| D9 | 5.54237 | 3.30342 | 0.99746 |
| D14 | 1.37919 | 3.63268 | 5.92102 |
| D16 | 1.19597 | 1.19822 | 1.19922 |
| D21 | 0.89956 | 0.88402 | 0.89933 |

The Fifth Embodiment

Figure 6:
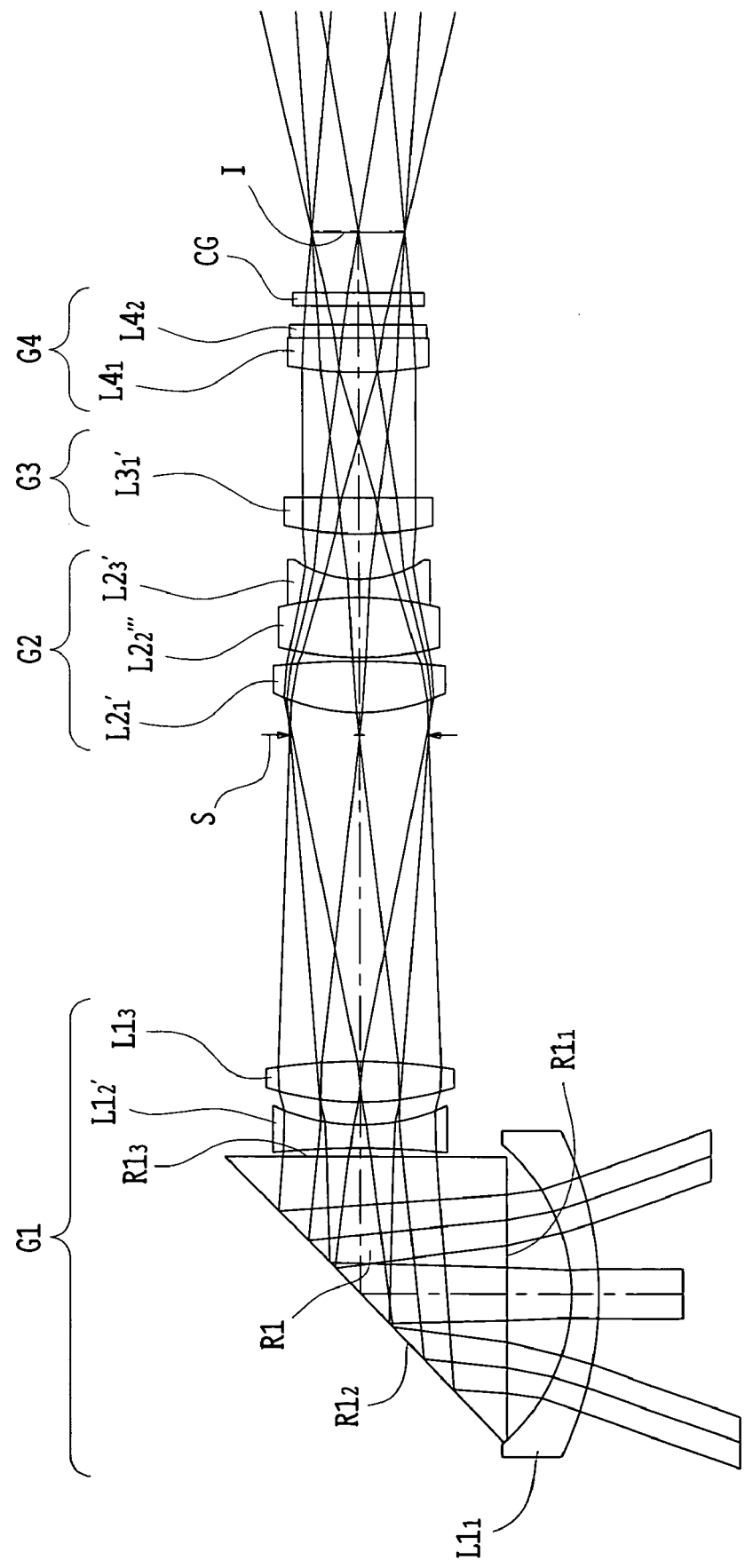
FIG. 6 is a sectional vies showing an optical arrangement, developed along the optical axis, at the wide-angle position, in focusing of the infinite object point, when an optical path is bent, about the fifth embodiment of an electronic imaging apparatus according to the present invention.

FIG. 6 is a sectional vies showing an optical arrangement, developed along the optical axis, at the wide-angle position, in focusing of the infinite object point, when an optical path is bent, about the fifth embodiment of an electronic imaging apparatus according to the present invention.

Figure 7A:
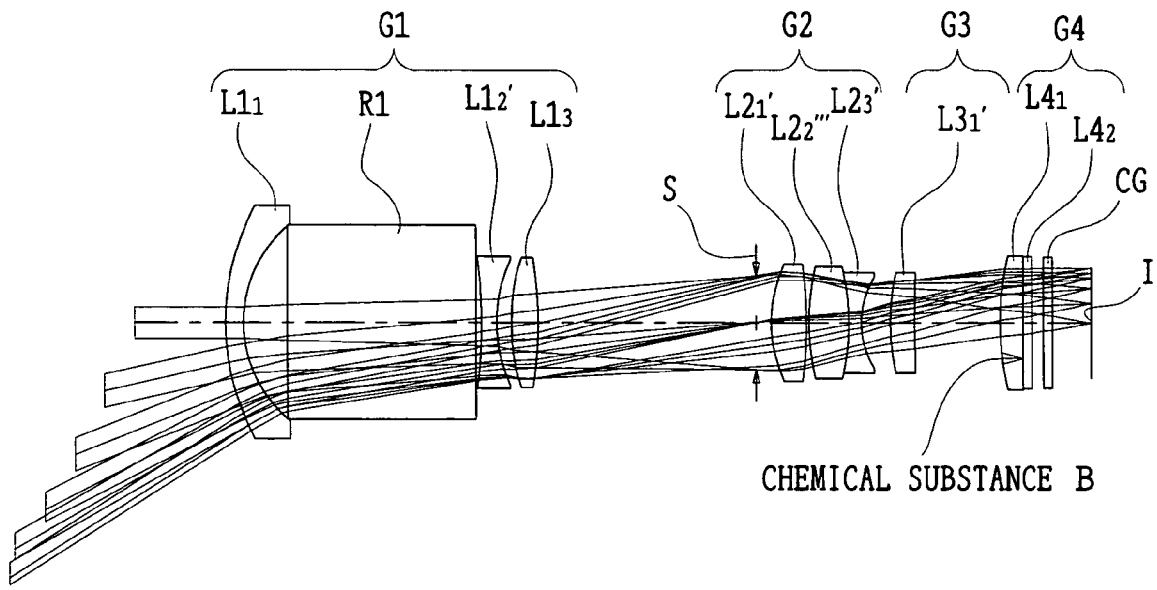
FIGS. 7A, 7B and 7C are sectional views showing an optical arrangement, developed along the optical axis, at the wide-angle middle and telephoto positions, respectively, in focusing of the infinite object point, about the electronic imaging apparatus shown in FIG. 6.
Figure 7B:
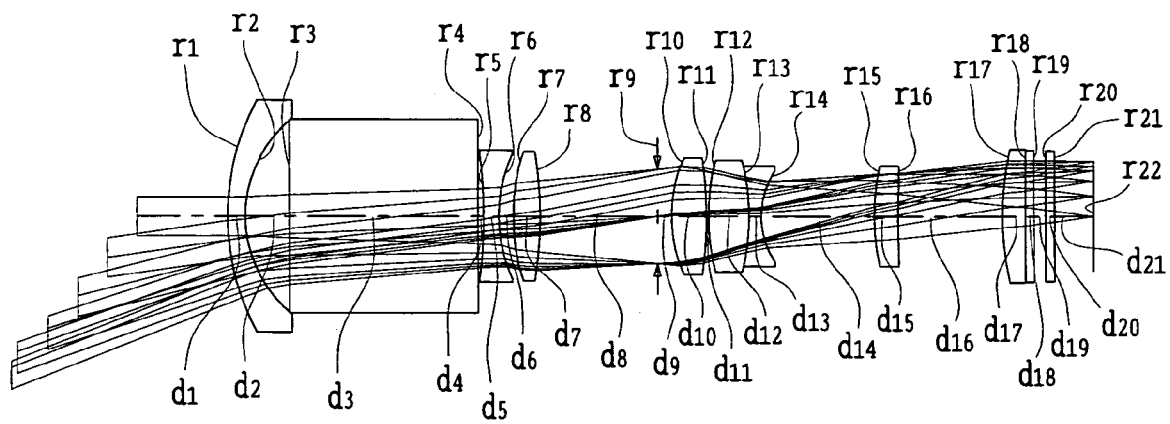
Figure 7C:
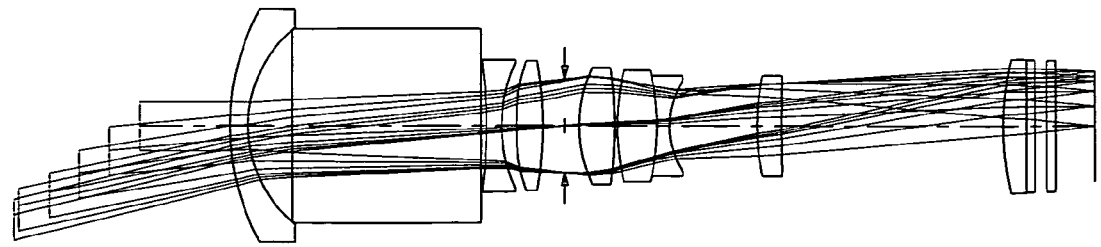

FIGS. 7A, 7B and 7C are sectional views showing an optical arrangement, developed along the optical axis, at the wide angle, middle and telephoto position respectively, in focusing of the infinite object point, about the electronic imaging apparatus shown in FIG. 6.

The electronic imaging apparatus of the fifth embodiment comprises in order from the object side an optical system including an optical elements according to the present invention. In FIGS. 6 and 7, reference symbol I represents an image plane of CCD that is an electronic imaging element and CG is a cover glass. Here, the aspect ratio of an effective imaging area is 3:4.

The optical system of the fifth embodiment comprises, in order from the object side, the first lens group G1, an aperture stop S, the second lens group G2, the third lens group G3 and the fourth lens group G4.

The first lens group G1 comprises, in order from an object side, a negative meniscus lens L1$_1$ having a convex surface directed to the object side and a reflecting optical element RI for bending an optical path, a double negative lens L1$_2$' and a double positive lens L1$_3$.

The reflecting optical element RI comprising an incident surface R1$_1$ and ann reflecting surface R1$_2$ for bending the optical path is constituted as an reflecting prism for bending the optical path by 90°. The bending direction is tranverse direction.

The second lens group G2 as a lens group B of the present invention mentioned above comprises,in order from the object side, a positive double convex lens L2$_1$' and a cemented lens having a positive double convex lens L2$_2$''' and a negative double concave lens L2$_3$', and it has positive refracting power as a whole.

The third lens group G3 comprises a positive meniscus lens L3$_1$' having a convex surface directed toward the object side.

The fourth lens group G4 comprises, in order from the object side, a positive lens L4$_1$ as an optical element A of a the present invention having a convex surface directed toward the object side and a flat surface directed toward the image side, and a transparent glass plate L4$_2$ having double flat surface as an optical element C of the present invention.

A medium (for example, chemical substance used in the electrochromic element with the spectrum characteristic shown in FIG. 14) in which transmittance of light varies by chemical change according to the amount of electricity as the chemical substance B of a the present invention is sandwiched between the flat surface of the positive lens L4$_1$ having a flat and a concave surface and the mating surface of the glass plate L4$_2$, whereby one lens component as a whole is constituted.

Moreover, a transparent electrode (illustration is not shown) is arranged between the positive lens L4$_1$ having a flat and a concave surface and the said medium, and between the said medium and the glass plate L4$_2$ respectively.

In case that the magnification is changed from a wide angle end to a telephoto end at focusing infinite object, it is constituted that the first lens group G1 is fixed, aperture stop S and the second lens group G2 move to the object side,and the third lens group G3 moves toward the object side so as to narrow slightly once after having widened the distance from the lens group G2, and the fourth lens group G4 always remains fixed. At the time of focusing operation, the third lens group G3 moves on the optical axis.

Next, data of optical members constituting the electronic imaging apparatus of the fifth embodiment is listed below.

| Numerical data 5 | | | |
|---|---|---|---|
| $r_1 = 16.0621$ | $d_1 = 1.2000$ | $n_{d1} = 1.80610$ | $v_{d1} = 40.92$ |
| $r_2 = 8.3645$ | $d_2 = 2.9000$ | | |
| $r_3 = \infty$ | $d_3 = 12.5000$ | $n_{d3} = 1.78590$ | $v_{d3} = 44.20$ |
| $r_4 = \infty$ | $d_4 = 0.4100$ | | |
| $r_5 = -31.2818$ | $d_5 = 1.0000$ | $n_{d5} = 1.80610$ | $v_{d5} = 40.92$ |
| $r_6 = 8.7365$ (aspherical) | $d_6 = 1.0000$ | | |
| $r_7 = 14.3899$ | $d_7 = 1.8200$ | $n_{d7} = 1.71736$ | $v_{d7} = 29.52$ |
| $r_8 = -24.1035$ | $d_8 = D8$ | | |
| $r_9 = \infty$ (aperture stop) | $d_9 = 1.0000$ | | |
| $r_{10} = 8.7325$ (aspherical) | $d_{10} = 2.3000$ | $n_{d10} = 1.80610$ | $v_{d10} = 40.92$ |
| $r_{11} = -33.2830$ | $d_{11} = 0.1500$ | | |
| $r_{12} = 15.6487$ | $d_{12} = 2.7000$ | $n_{d12} = 1.69350$ | $v_{d12} = 53.21$ |
| $r_{13} = -15.0000$ | $d_{13} = 0.8000$ | $n_{d13} = 1.80518$ | $v_{d13} = 25.42$ |
| $r_{14} = 5.4464$ | $d_{14} = D14$ | | |
| $r_{15} = 16.0980$ | $d_{15} = 1.6000$ | $n_{d15} = 1.48749$ | $v_{d15} = 70.23$ |
| $r_{16} = 189.4865$ | $d_{16} = D16$ | | |
| $r_{17} = 18.7236$ (aspherical) | $d_{17} = 1.5000$ | $n_{d17} = 1.69350$ | $v_{d17} = 53.21$ |
| $r_{18} = \infty$ | $d_{18} = 0.6000$ | $n_{d18} = 1.69350$ | $v_{d18} = 53.21$ |
| $r_{19} = \infty$ | $d_{19} = 0.8000$ | | |
| $r_{20} = \infty$ | $d_{20} = 0.6000$ | $n_{d20} = 1.51633$ | $v_{d20} = 64.14$ |
| $r_{21} = \infty$ | $d_{21} = D21$ | | |
| $r_{22} = \infty$ (image plane) | $d_{22} = 0$ | | | aspherical coefficient the sixth surface $K = 0$
$A_4 = -3.6707 \times 10^{-4}$  $A_6 = 3.8769 \times 10^{-6}$  $A_8 = -1.3374 \times 10^{-7}$
$A_{10} = 0$ the tenth surface $K = 0$
$A_4 = -2.3323 \times 10^{-4}$  $A_6 = -8.7577 \times 10^{-7}$  $A_8 = -3.8688 \times 10^{-8}$
$A_{10} = 0$ the seventeenth surface $K = 0$
$A_4 = -2.4780 \times 10^{-4}$  $A_6 = 1.1220 \times 10^{-5}$  $A_8 = -3.8744 \times 10^{-7}$
$A_{10} = 0$ Zoom data
D0 (the distance of the first surface from the object) is $\infty$.

| | wide angle end | middle | telephoto end |
|---|---|---|---|
| f (mm) | 6.00205 | 9.32999 | 14.49987 |
| Fno. | 2.8339 | 3.6263 | 4.5287 |
| D0 | $\infty$ | $\infty$ | $\infty$ |
| D8 | 14.54324 | 7.74846 | 1.50004 |
| D14 | 1.99997 | 7.53021 | 5.90077 |
| D16 | 5.56252 | 6.84013 | 14.70483 |
| D21 | 2.64284 | 2.62311 | 2.64285 |

The Sixth Embodiment

FIG. 8 is a sectional view showing an optical arrangement, developed along the optical axis, at the wide angle position, in focusing of the infinite object point, when an optical path is bent, about the sixth embodiment of an electronic imaging apparatus according to the present invention.

The electronic imaging apparatus of the sixth embodiment is a modification of the fourth embodiment shown in FIGS. 4 and 5, and the reflecting optical element R1 in the first group is constituted as the optical component mentioned above in the present invention instead of the fifth lens group G5.

Reflecting optical element R1 is constituted as prism P used as an optical element A of the present invention and the second surface $R1_2$ formed on a flat surface on the prism is arranged so as to contact with a medium (for example, chemical substance used in the electrochromic element with the spectrum characteristic shown in FIG. 14) in which transmittance of light varies by chemical change according to the amount of electricity as the chemical substance B of the present invention, and a reflecting film is coated on the medium or a flat shape member having a reflecting film is arranged to contact with the medium, whereby one optical component as a whole is constituted.

Moreover, a transparent electrode (illustration is not shown) is arranged between the second surface $R1_2$ of the prism and the said medium, and between the said medium and the reflecting film respectively.

Moreover, the fifth lens group G5 consists of only a positive lens $L5_1$ having a flat surface and a convex surface. Other constitutions are almost same as that of the electronic imaging apparatus of the fourth embodiment.

In addition, a transparent member having flat surfaces is used as a flat plate shape member having reflecting film and reflecting coating can be carried out on either one of the flat surfaces.

Other constitutions are almost same as that of the electronic imaging apparatus of the fifth embodiment.

The Seventh Embodiment

Figure 9:
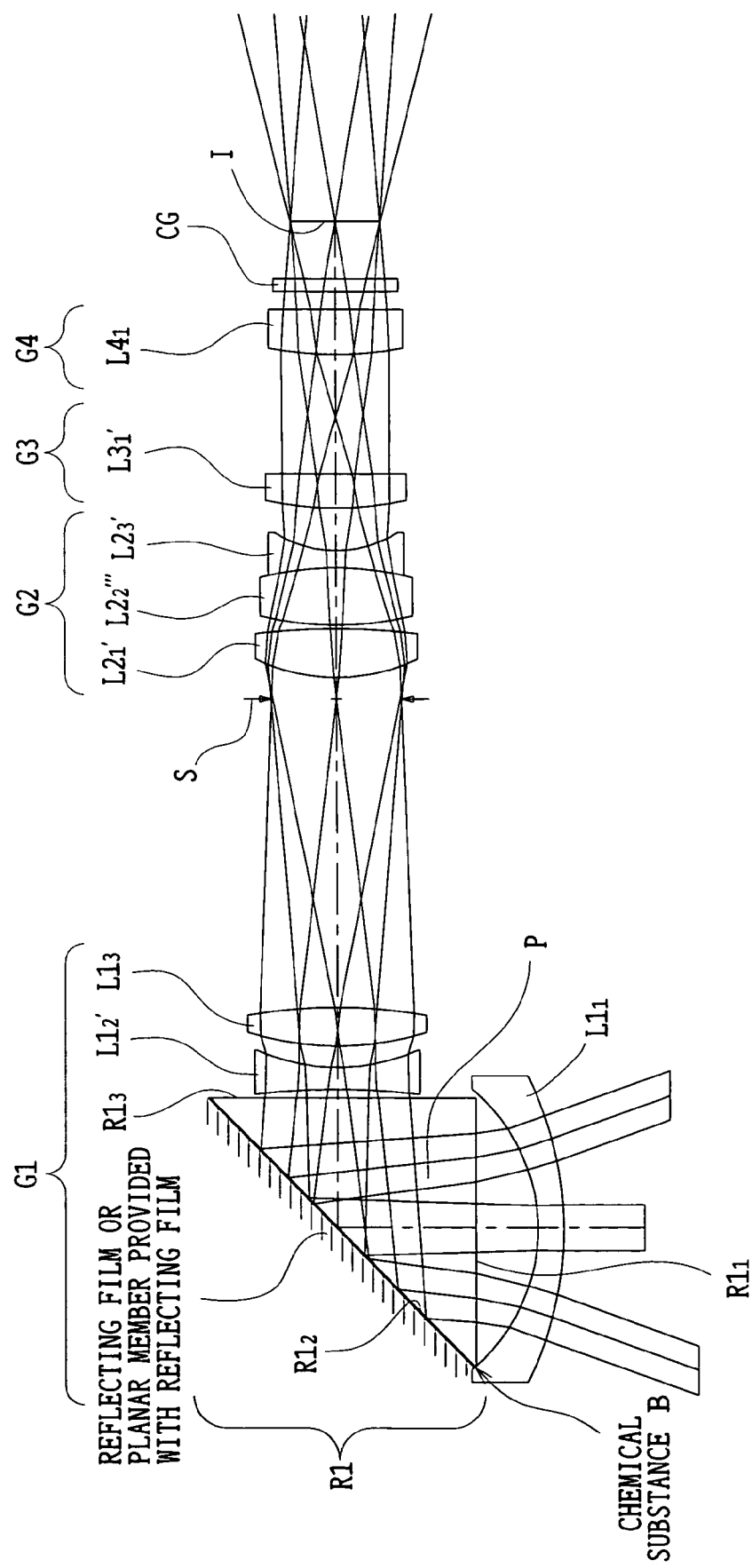
FIG. 9 is a sectional vies showing an optical arrangement, developed along the optical axis, at the wide-angle position, in focusing of the infinite object point, when an optical path is bent, about the seventh embodiment of an electronic imaging apparatus according to the present invention.

FIG. 9 is a sectional view showing an optical arrangement, developed along the optical axis, at the wide angle position, in focusing of the infinite object point, when an optical path is bent, about the seventh embodiment of an electronic imaging apparatus according to the present invention.

The electronic imaging apparatus of the seventh embodiment is a modification of the fifth embodiment shown in FIGS. 6 and 7, and the reflecting optical element R1 in the first group is constituted as the optical component mentioned above in the present invention instead of the fourth lens group G4.

Reflecting optical element R1 is constituted as prism P which is used as an optical element A of the present invention and the second surface $R1_2$ foremd on a flat surface on the prism is arranged so as to contact with a medium (for example, chemical substance used in the electrochromic element with the spectrum characteristic shown in FIG. 14) in which transmittance of light varies by chemical change according to the amount of electricity as the chemical substance B of the present invention, and a reflecting film is coated on the medium or a flat shape member having a reflecting film is arranged to contact with the medium, whereby one optical component as a whole is constituted.

Moreover, a transparent electrode (illustration is not shown) is arranged between the second surface $R1_2$ of a variable form mirror and the said medium, and between the said medium and the reflecting film respectively.

The fourth lens group G4 consists of only a positive lense $L4_1$ having a flat surface and a convex surface.

In addition, a transparent member having flat surfaces is used as a flat plate shape member having reflecting film and reflecting coating can be carried out on either one of the flat surfaces. Other constitutions are almost same as that of the electronic imaging apparatus of the fifth embodiment.

The Eighth Embodiment

FIG. 10 is a sectional view showing an optical arrangement, developed along the optical axis, at the wide angle position, in focusing of the infinite object point, when an optical path is bent, about the eighth embodiment of an electronic imaging apparatus according to the present invention.

The electronic imaging apparatus of the eight embodiment is a modification of the fifth embodiment shown in FIGS. 6 and 7, and the reflecting optical element R1 in the first group is constituted as the optical component mentioned above in the present invention instead of the fourth lens group G4.

Reflecting optical element R1 having an incident surface $R1_1$, an reflecting surface $R1_2$ for bending an optical path and an exit surface $R1_3$ are constituted as prism P for bending the optical path by 90° which is used as an optical element A of the present invention and it is arranged so as to contact with a medium (for example, chemical substance used in the electrochromic element with the spectrum characteristic shown in FIG. 14) in which transmittance of light varies by chemical change according to the amount of electricity as the chemical substance B of the present invention, and a thin transparent protecting film layer is coated to the medium, whereby one optical component as a whole is constituted.

Moreover, a transparent electrode (illustration is not shown) is arranged between the reflecting surface $R1_1{'}$ of a variable form mirror and the said medium, and between the said medium and the thin transparent protecting film layer respectively.

The fourth lens group G4 is constituted with only a positive flat-covex lens $L4_1$.

Other constitutions are almost same as that of the electronic imaging apparatus of the fifth embodiment.

The Nineth Embodiment

Figure 11A:
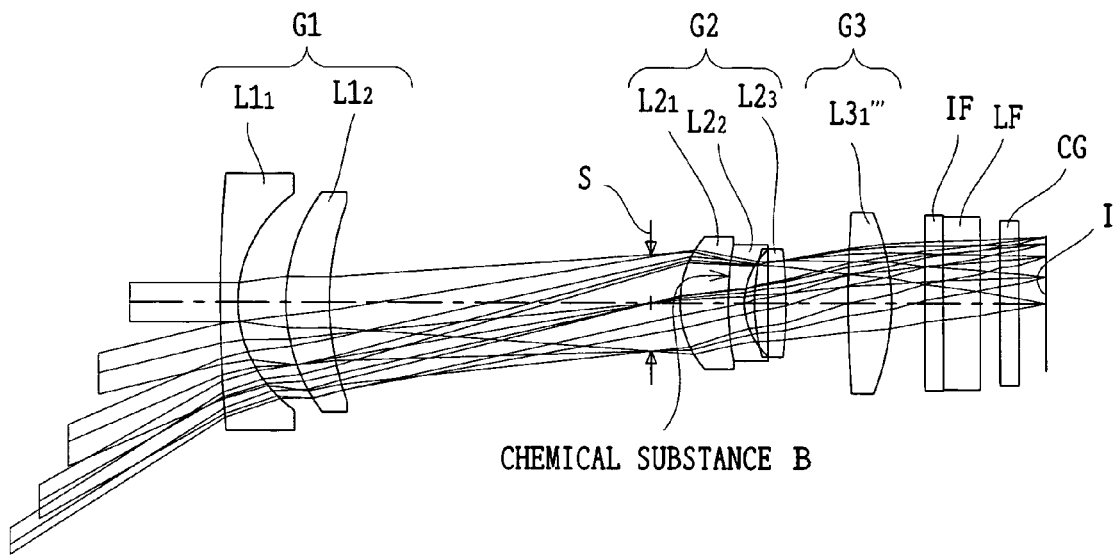
FIGS. 11A, 11B and 11C are sectional views showing an optical arrangement, developed along the optical axis, at the wide-angle middle and telephoto positions, respectively, in focusing of the infinite object point, about the ninth embodiment of an electronic imaging apparatus according to the present invention.
Figure 11B:
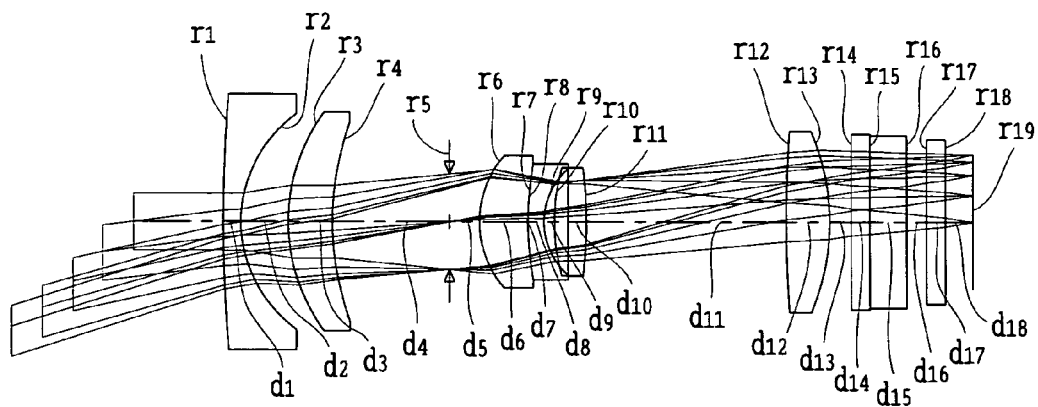
Figure 11C:
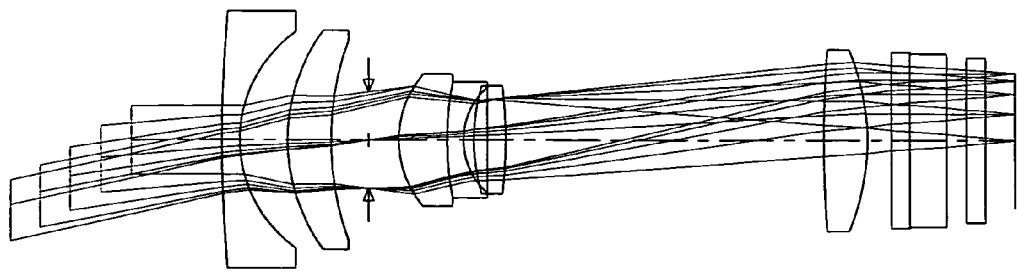

FIGS. 11A, 11B and 11C are sectional views showing an optical arrangement, developed along the optical axis, at the wide angle middle and telephoto position respectively, in focusing of the infinite object point, about the ninth embodiment of an electronic imaging apparatus according to the present invention.

The electronic imaging apparatus of the fourth embodiment comprises in order from an object side an optical system having an optical component according to the present invention. In FIG. 11, reference symbol IF represents IR cut filter, LF is a low pass filter, reference symbol I represents an image plane of CCD that is an electronic imaging element and CG is a cover glass. Here, the aspect ratio of an effective imaging area is 3:4.

The optical system of the nineth embodiment comprises, in order from the object side, the first lens group G1, an aperture stop S, the second lens group G2 and the third lens group G3.

The first lens group G1 comprises, in order from an object side, a negative meniscus lens $L1_1$ having a convex surface directed to the object side and a positive meniscus lens $L1_2$ having a convex surface directed to the object side.

The second lens group G2 comprises, in order from the object side, a positive meniscus lens $L2_1$ having a convex surface directed toward the object side as an optical element A, a negative meniscus lens $L2_2$ having a convex surface direcred toward the object side as an optical element C of the present invention, and a positive double convex lens $L2_3$.

The positive meniscus lens $L2_1$ and the negative meniscus lens $L2_2$ are constituted so that a medium (for example, chemical substance used in the electrochromic element with the spectrum characteristic shown in FIG. 14) in which transmittance of light varies by chemical change according to the amount of electricity as a chemical substance B of the present invention is sandwiched between the image side surface of the positive meniscus lens $L2_1$ and the object side surface of the negative meniscus lens $L2_2$.

Moreover, a transparent electrode (illustration omitted) is arranged between the positive meniscus lens $L2_1$ and the said medium, and between the said medium and the negative meniscus lens $L2_2$ respectively.

The third lens group G3 is consituted with a positive double convex lens $L31'''$.

In case that the magnification is changed from a wide angle end to a telephoto end at focusing infinite object, it is constituted that the first lens group G1 moves to the object side once after having moved toward the image side, the aperture stop S and the second lens group G2 move to the object side, and the third lens group G3 moves slightly to the object side once after having moved to the image side. At the time of focusing operation, the third lens group G3 moves on the optical axis.

Next, data of optical members constituting the electronic imaging apparatus of the nineth embodiment is listed below.

| Numerical data 9 | | | |
|---|---|---|---|
| $r_1 = 68.7182$ | $d_1 = 0.7000$ | $n_{d1} = 1.74320$ | $v_{d1} = 49.34$ |
| $r_2 = 4.9226$ (aspherical) | $d_2 = 2.0000$ | | |
| $r_3 = 7.6018$ | $d_3 = 1.8000$ | $n_{d3} = 1.84666$ | $v_{d3} = 23.78$ |
| $r_4 = 12.5682$ | $d_4 = D4$ | | |
| $r_5 = \infty$ (aperture stop) | $d_5 = 1.2000$ | | |
| $r_6 = 3.8539$ (aspherical) | $d_6 = 2.0000$ | $n_{d6} = 1.80610$ | $v_{d6} = 40.92$ |
| $r_7 = 11.4000$ | $d_7 = 0.0500$ | $n_{d7} = 1.50000$ | $v_{d7} = 55.00$ |
| $r_8 = 11.9255$ | $d_8 = 0.7000$ | $n_{d8} = 1.84666$ | $v_{d8} = 23.78$ |
| $r_9 = 3.1027$ | $d_9 = 0.4000$ | | |
| $r_{10} = 8.7087$ | $d_{10} = 1.3000$ | $n_{d10} = 1.69350$ | $v_{d10} = 53.21$ |
| $r_{11} = -19.8010$ (aspherical) | $d_{11} = D11$ | | |
| $r_{12} = 56.2848$ | $d_{12} = 1.8000$ | $n_{d12} = 1.48749$ | $v_{d12} = 70.23$ |
| $r_{13} = -10.1230$ | $d_{13} = D13$ | | |
| $r_{14} = \infty$ | $d_{14} = 0.8000$ | $n_{d14} = 1.51633$ | $v_{d14} = 64.14$ |
| $r_{15} = \infty$ | $d_{15} = 1.5000$ | $n_{d15} = 1.54771$ | $v_{d15} = 62.84$ |
| $r_{16} = \infty$ | $d_{16} = 0.8000$ | | |
| $r_{17} = \infty$ | $d_{17} = 0.7500$ | $n_{d17} = 1.51633$ | $v_{d17} = 64.14$ |
| $r_{18} = \infty$ | $d_{18} = D18$ | | |
| $r_{19} = \infty$ (image plane) | $d_{19} = 0$ | | | aspherical coefficient the second surface $K = 0$
$A_4 = -7.4624 \times 10^{-4}$   $A_6 = 1.8315 \times 10^{-5}$   $A_8 = -2.6433 \times 10^{-6}$
$A_{10} = 0$ the sixth surface $K = 0$
$A_4 = -6.2153 \times 10^{-4}$   $A_6 = -5.8247 \times 10^{-5}$   $A_8 = -3.0307 \times 10^{-6}$
$A_{10} = 0$ the eleventh surface $K = 0$
$A_4 = 3.1174 \times 10^{-4}$   $A_6 = -1.9816 \times 10^{-4}$   $A_8 = -2.9586 \times 10^{-6}$
$A_{10} = 0$ Zoom data
D0 (the distance of the first surface from the object) is ∞.

| | wide angle end | middle | telephoto end |
|---|---|---|---|
| f (mm) | 4.55602 | 8.74739 | 12.96880 |
| Fno. | 2.6761 | 3.6342 | 4.5240 |
| D0 | ∞ | ∞ | ∞ |
| D4 | 13.12518 | 4.78440 | 1.50000 |
| D11 | 2.53628 | 8.21322 | 13.04478 |
| D13 | 1.40000 | 0.89438 | 1.00537 |
| D18 | 1.20493 | 1.24272 | 1.29631 |

The Tenth Embodiment

Figure 12:
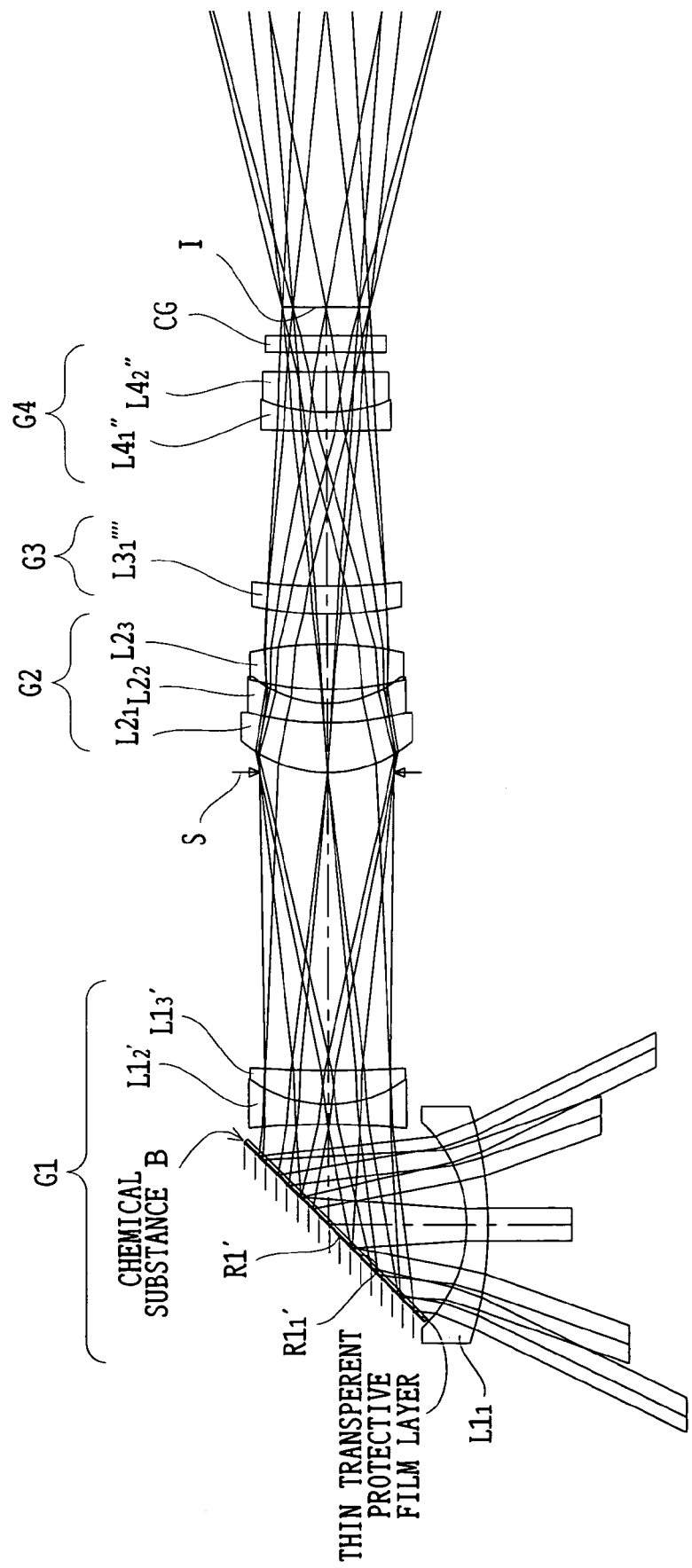
FIG. 12 is a sectional vies showing an optical arrangement, developed along the optical axis, at the wide-angle position, in focusing of the infinite object point, when an optical path is bent, about the tenth embodiment of an electronic imaging apparatus according to the present invention.
Figure 13A:
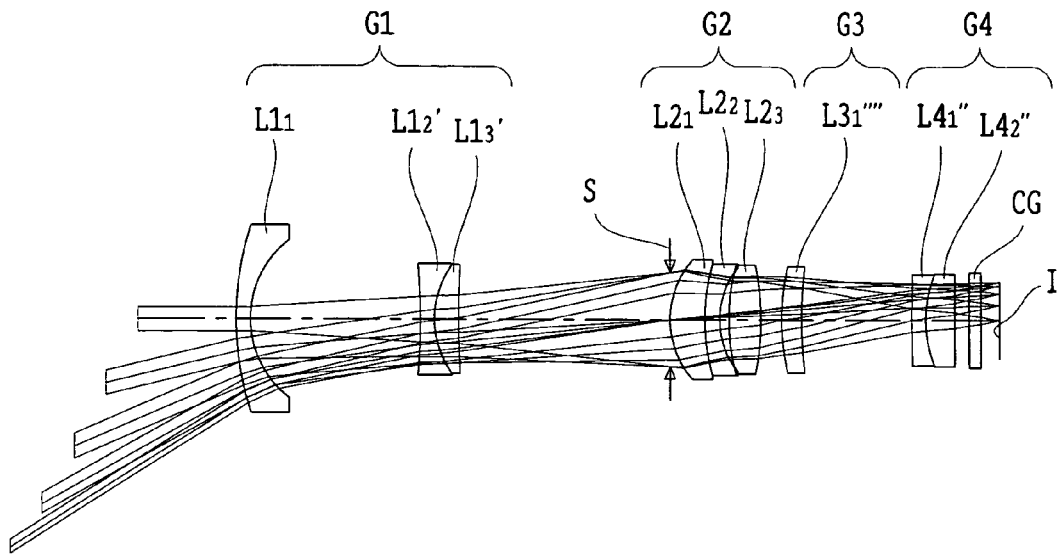
FIGS. 13A, 13B and 13C are sectional views showing an optical arrangement, developed along the optical axis, at the wide angle middle and telephoto positions, respectively, in focusing of the infinite object point, about an electronic imaging apparatus shown in FIG. 12.
Figure 13B:
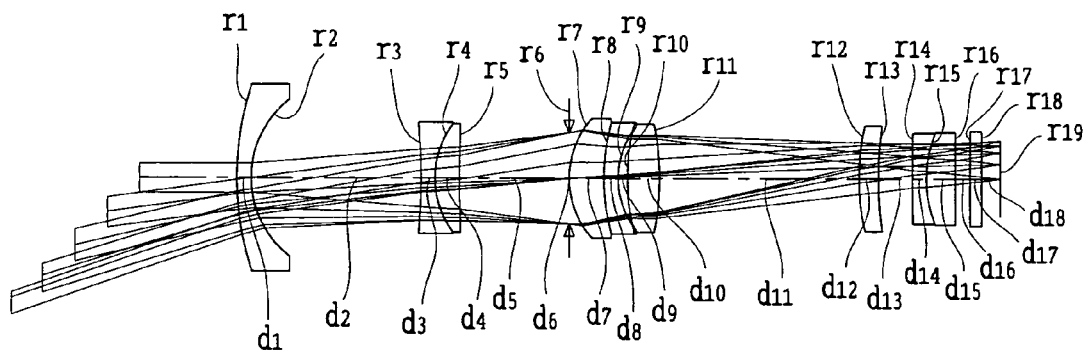
Figure 13C:
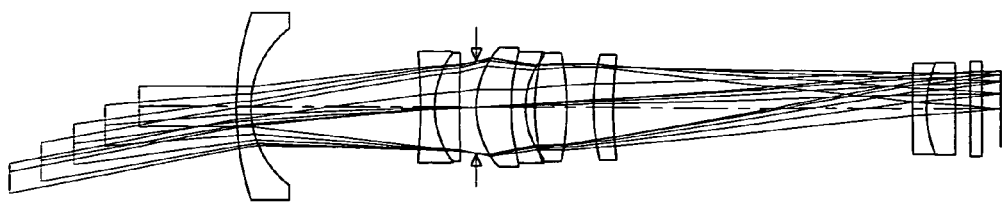

FIG. 12 is a sectional view showing an optical arrangement, developed along the optical axis, at the wide angle position, in focusing of the infinite object point, when an optical path is bent, about the tenth embodiment of an electronic imaging apparatus according to the present invention. FIGS. 13A, 13B and 13C are sectional views showing an optical arrangement, developed along the optical axis, at the wide angle, middle and telephoto position respectively,in focusing of the infinite object point, of an electronic imaging apparatus shown in FIG. 12.

The electronic imaging apparatus of the tenth embodiment comprises in order from an object side an optical system having an optical component according to the present invention.

In FIGS. 12 and 13, reference numeral I represents an image plane of CCD that is an electronic imaging element and CG is a cover glass. Here, the aspect ratio of an effective imaging area is 3:4.

The optical system of the tenth embodiment comprises, in order from the object side, the first lens group G1, an aperture stop S, the second lens group G2, the third lens group G3 and the fourth lens group G4.

The first lens group G1 comprises, in order from an object side, negative meniscus lens $L1_1$ having a convex surface directed toward the object lens, a reflecting optical element R1' for bending an optical path and a cemented lens having a double concave lens $L1_2'$ and a positive meniscus lens $L1_3'$ having a convex surface directed the object side.

The reflecting optical element R1' is constituted as a variable form mirror which has reflecting surface R11' and bends the optical path by 90°. A bending direction is a transverse direction.

The reflecting optical element R1' is used as an optical element A of the present invention and it is arranged so as to contact with a medium (for example, chemical substance used in the electrochromic element with the spectrum characteristic shown in FIG. 14) in which transmittance of light varies by chemical change according to the amount of electricity as the chemical substance B of the present invention, and a thin transparent protecting film layer is coated to the medium, whereby one optical component as a whole is constituted.

Moreover, a transparent electrode (illustration is not shown) is arranged between the reflecting surface $R1_1'$ of a variable form mirror and the said medium, and between the said medium and the thin transparent protecting film layer respectively.

The second lens group G2 comprises, in order from the object side, a cemented lens which is constituted with a positive meniscus lens $L2_1$ having a convex surface directed toward the object side and a negative meniscus lens $L2_2$, having a convex surface toward the object side, and a positive double convex lens $L2_3$.

The third lens group G3 comprises a negative meniscus lens $L3_1''''$ having a convex surface directed toward the object side.

The fourth lens group G4 comprises a cemented lens which is constituted with a negative meniscus lens $L4_1''$ having a convex surface directed toward the object side and a positive double convex lens $L4_2''$.

In case that the magnification ratio is changed from a wide angle end to a telephoto end at focusing infinite object, it is constituted that the first lens group G1 is fixed, the aperture stop S and the second lens group G2 move to the object side, the third lens group G3 moves to the object side once after having moved the image side and the position of the fourth lens group G4 is fixed. At the time of focusing operation, it is constituted that the fourth lens group G3 moves on the optical axis.

Next, data of optical members constituting the electronic imaging apparatus of the tenth embodiment is listed below.

Numerical data 10

| | | | |
|---|---|---|---|
| $r_1 = 15.5466$ | $d_1 = 0.7000$ | $n_{d1} = 1.77250$ | $v_{d1} = 49.60$ |
| $r_2 = 4.8517$ (aspherical) | $d_2 = 1.7000$ | | |
| $r_3 = \infty$ | $d_3 = 6.8000$ | | |
| $r_4 = \infty$ | $d_4 = 0.1500$ | | |
| $r_5 = -27.3963$ | $d_5 = 0.7000$ | $n_{d5} = 1.74320$ | $v_{d5} = 49.34$ |
| $r_6 = 4.8487$ | $d_6 = 1.2500$ | $n_{d6} = 1.80100$ | $v_{d6} = 34.97$ |
| $r_7 = 45.1811$ | $d_7 = D7$ | | |
| $r_8 = \infty$ (aperture stop) | $d_8 = 0$ | | |
| $r_9 = 4.4863$ (aspherical) | $d_9 = 1.8000$ | $n_{d9} = 1.74320$ | $v_{d9} = 49.34$ |
| $r_{10} = 11.0000$ | $d_{10} = 0.7000$ | $n_{d10} = 1.84666$ | $v_{d10} = 27.38$ |
| $r_{11} = 4.2567$ | $d_{11} = 0.5000$ | | |
| $r_{12} = 10.7453$ | $d_{12} = 1.6500$ | $n_{d12} = 1.72916$ | $v_{d12} = 54.68$ |
| $r_{13} = -14.5935$ | $d_{13} = D13$ | | |
| $r_{14} = 12.7727$ | $d_{14} = 1.0000$ | $n_{d14} = 1.48749$ | $v_{d14} = 70.23$ |
| $r_{15} = 20.3281$ | $d_{15} = D15$ | | |
| $r_{16} = 58.0852$ | $d_{16} = 0.7000$ | $n_{d16} = 1.84666$ | $v_{d16} = 23.78$ |
| $r_{17} = 6.5000$ | $d_{17} = 1.4500$ | $n_{d17} = 1.74320$ | $v_{d17} = 49.34$ |
| $r_{18} = -51.3433$ (aspherical) | $d_{18} = 0.7000$ | | |
| $r_{19} = \infty$ | $d_{19} = 0.6000$ | $n_{d19} = 1.51633$ | $v_{d19} = 64.14$ |
| $r_{20} = \infty$ | $d_{20} = D19$ | | |
| $r_{21} = \infty$ (image plane) | $d_{21} = 0$ | | | aspherical coefficient the second surface $K = 0$
$A_4 = -3.1826 \times 10^{-4}$   $A_6 = -1.6763 \times 10^{-5}$   $A_8 = -7.7198 \times 10^{-7}$
$A_{10} = 0$ the nineth surface $K = 0$
$A_4 = -6.9648 \times 10^{-4}$   $A_6 = -8.0348 \times 10^{-6}$   $A_8 = -1.6092 \times 10^{-6}$
$A_{10} = 0$ the eighteen surface $K = 0$
$A_4 = 6.1299 \times 10^{-5}$   $A_6 = 5.4502 \times 10^{-4}$   $A_8 = -6.3390 \times 10^{-5}$
$A_{10} = 0$ Zoom data
D0 (the distance of the first surface from the object) is $\infty$.

| | wide angle end | middle | telephoto end |
|---|---|---|---|
| f (mm) | 3.25820 | 5.63973 | 9.74758 |
| Fno. | 2.6621 | 3.5594 | 4.5487 |
| D0 | $\infty$ | $\infty$ | $\infty$ |
| D7 | 10.78027 | 5.54380 | 0.89779 |
| D13 | 1.09990 | 10.18514 | 1.29971 |
| D15 | 5.62926 | 1.79170 | 15.31194 |
| D20 | 0.99998 | 0.98447 | 0.99998 |

Next, the parameter values of conditions (1)-(4) in the first to the fifth, the nineth and the tenth embodiment and the index of refraction of a prism are shown in Table 1 and Table 2.

Although Table 1 and Table 2 show only the maximum and the minimum value of transmittance, the mean value of those values can also be taken continuously.

TABLE 1

| | First embodiment | Second embodiment | Third embodiment | Fourth embodiment | Fifth embodiment |
|---|---|---|---|---|---|
| $(R_A - R_C)/(R_A + R_C)$ | — | — | — | — | — |
| τ440/τ520 (at τmax) | 0.951 | 0.951 | 0.951 | 0.951 | 0.951 |
| τ600/τ520 (at τmax) | 0.994 | 0.994 | 0.994 | 0.994 | 0.994 |
| τ440/τ520 (at τmin) | 0.917 | 0.917 | 0.917 | 0.917 | 0.917 |

TABLE 1-continued

|  | First embodiment | Second embodiment | Third embodiment | Fourth embodiment | Fifth embodiment |
|---|---|---|---|---|---|
| τ600/τ520 (at τmin) | 1.028 | 1.028 | 1.028 | 1.028 | 1.028 |
| τ520 (at τmax) | 0.81 | 0.81 | 0.81 | 0.81 | 0.81 |
| τ520 (at τmin) | 0.18 | 0.18 | 0.18 | 0.18 | 0.18 |
| Fno. (at the shortest focal distance) | 2.5426 | 2.6413 | 2.6768 | 2.8592 | 2.8339 |
| pixel pitch a (μm) | 2.5 | 2.2 | 2 | 2 | 2 |
| refracting power of of prism | — | — | — | 1.8061 | 1.80518 |

TABLE 2

|  | Nineth embodiment | Tenth embodiment |
|---|---|---|
| $(R_A - R_C)/(R_A + R_C)$ | −0.023 | — |
| τ440/τ520 (at τmax) | 0.951 | 0.951 |
| τ600/τ520 (at τmax) | 0.994 | 0.994 |
| τ440/τ520 (at τmin) | 0.917 | 0.917 |
| τ600/τ520 (at τmin) | 1.028 | 1.028 |
| τ520 (at τmax) | 0.81 | 0.81 |
| τ520 (at τmin) | 0.18 | 0.18 |
| Fno. (at the shortest focal distance) | 2.6761 | 2.6621 |
| pixel pitch a (μm) | 2 | 2 |
| refracting power of prism | — | — |

Figure 15:
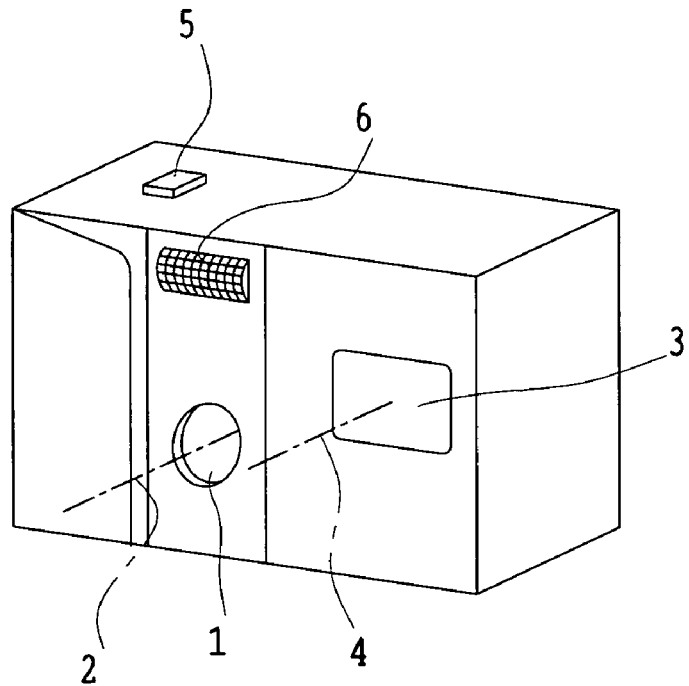
FIG. 15 is a front perspective view showing a digital camera equipped with an electronic imaging apparatus according to the present invention.
Figure 16:
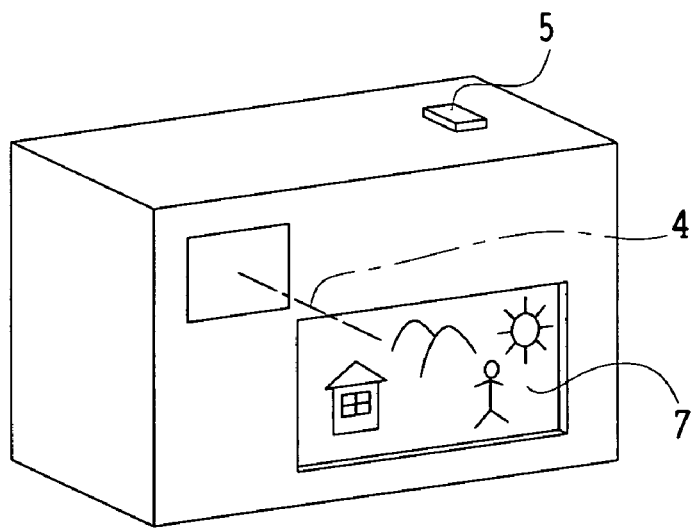
FIG. 16 is a rear perspective view of the digital camera shown in FIG. 15.

FIGS. 15 and 16 are outlined diagrams of the digital camera equipped with an electronic imaging apparatus according to the present invention. Here, FIG. 15 is a front perspective view of the digital camera showing external view and FIG. 16 is a rear perspective view of the same. In addition, the digital camera shown in FIG. 15 has constitution in which the photograghing optical path is bent in the traversed direction of the main part of the digital camera.

In the case of this example, the digital camera comprises a photographing optical system 1 having the photographing optical path 2, the finder optical system 3 having an optical path 4 for the finder, a shutter 5, a flash 6 and a liquid crystal display monitor 7, etc. When the shutter 5 arranged on the upper part of the camera is pressed, with interlocking operation photographing will be performed through the photograghing optical system 1, for example, via the optical system for bending optical path of the first embodiment.

What is claimed is:

1. An electronic imaging apparatus comprising:
   an optical system comprising an optical component, the optical component comprising:
      a first optical element having at least one surface with a refractive power or at least having one plane surface and two transmitting surfaces;
      chemical substance, light transmittance of which is changeable by chemical change according to electric quantity; and
      a second optical element having a transmitting surface or a reflecting surface; and
   an electronic imaging element for converting an object image obtained through the optical system into an electric signal,
   wherein the optical component is constructed and arranged so that the chemical substance is sandwiched between one of optical surfaces of the first optical element and one of optical surfaces of the second optical element, and
   wherein the optical system and the electronic imaging element satisfy the following condition:

$F > a (a \leq 3.5/\mu m)$ where F is a fully opened F value of the optical system under a condition where a focal length is in a shortest state, and reference symbol a represents a pixel pitch in micrometer of the electronic imaging element in a horizontal or vertical direction of the electronic imaging element.

2. An electronic imaging apparatus comprising:
   an optical system comprising an optical component, the optical component comprising:
      a first optical element having a plane surface and a surface with a refractive power or a plane surface and a reflecting surface;
      chemical substance, light transmittance of which is changeable by chemical change according to electric quantity; and
      a second optical element having a transmitting or reflecting surface and a plane surface; and
   an electronic imaging element for converting an object image obtained through the optical system into an electric signal,
   wherein the optical component is constructed and arranged so that the chemical substance is sandwiched between the plane surface of the first optical element and the plane surface of the second optical element, and
   wherein the optical system and the electronic imaging element satisfy the following condition:

$F > a (a < 3.5/\mu m)$ where F is a fully opened F value of the optical system under a condition where a focal length is in a shortest state, and reference symbol a represents a pixel pitch in micrometer of the electronic imaging element in a horizontal or vertical direction of the electronic imaging element.

3. An electronic imaging apparatus according to claim 2, wherein the second optical element is either one of a parallel plane board, a lens having a surface with a refractive power and a plane surface, and a lens consisting of surfaces each having a refractive power.

4. An electronic imaging apparatus according to claim 2, wherein the optical component satisfies the following condition:

$$-0.05 < (R_A - R_C)/(R_A + R_C) < 0.05$$

where $R_A$ is a curvature radius of the surface of the first optical element contacted with the chemical substance and $R_C$ is a curvature radius of the surface of the second optical element contacted with the chemical substance.

* * * * *